US012262373B2

(12) United States Patent
Abdelghaffar et al.

(10) Patent No.: US 12,262,373 B2
(45) Date of Patent: Mar. 25, 2025

(54) TECHNIQUES FOR INTER-SLOT AND INTRA-SLOT FREQUENCY HOPPING IN FULL DUPLEX

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Ahmed Attia Abotabl, San Diego, CA (US); Gokul Sridharan, Sunnyvale, CA (US); Hung Dinh Ly, San Diego, CA (US); Hwan Joon Kwon, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 17/651,740

(22) Filed: Feb. 18, 2022

(65) Prior Publication Data

US 2023/0284210 A1   Sep. 7, 2023

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0012* (2013.01); *H04L 5/14* (2013.01); *H04W 72/02* (2013.01); *H04W 72/0446* (2013.01)

(58) Field of Classification Search
CPC ..... H04L 1/189; H04L 1/1893; H04L 1/1896; H04L 5/001; H04L 5/0012; H04L 5/0094;
(Continued)

(56) References Cited

U.S. PATENT DOCUMENTS 11,696,269 B2 *   7/2023   Kwak .................. H04L 1/1864
                                                          370/329
11,882,080 B2 *   1/2024   Ly ........................ H04L 5/1438
(Continued)

FOREIGN PATENT DOCUMENTS

CN          118140425 A   *  6/2024  ........... H04B 1/7143
WO    WO-2022185281 A1   *  9/2022  ........... H04L 5/0053
(Continued)

OTHER PUBLICATIONS

International Preliminary Report on Patentability—PCT/US2023/061174—The International Bureau of WIPO—Geneva, Switzerland—May 15, 2023.

*Primary Examiner* — Eric Nowlin
(74) *Attorney, Agent, or Firm* — Patterson & Sheridan, LLP

(57) ABSTRACT

Certain aspects of the present disclosure provide techniques for inter-slot and intra-slot frequency hopping in full duplex. A method performed by a user equipment (UE) includes receiving scheduling information from a network entity, wherein the scheduling information schedules transmission of a plurality of uplink data channel repetitions in a plurality of slots according to a frequency hopping scheme that configures frequency hops between transmissions of repetitions of the plurality of uplink data channel repetitions. The method also includes taking one or more actions related to transmitting, according to the frequency hopping scheme, the plurality of uplink data channel repetitions in the plurality of slots based on the scheduling information.

29 Claims, 21 Drawing Sheets

(51) Int. Cl.
  *H04L 5/14* (2006.01)
  *H04W 72/02* (2009.01)
  *H04W 72/0446* (2023.01)
(58) Field of Classification Search
  CPC .... H04L 5/14; H04W 72/02; H04W 72/0446; H04W 72/1268
  See application file for complete search history.

(56) References Cited

U.S. PATENT DOCUMENTS

| | | | | |
|---|---|---|---|---|
| 2015/0011233 | A1* | 1/2015 | Kazmi | H04W 72/044 |
| | | | | 455/454 |
| 2019/0089502 | A1* | 3/2019 | Yi | H04W 16/14 |
| 2019/0357149 | A1* | 11/2019 | Zhang | H04W 52/146 |
| 2021/0320779 | A1 | 10/2021 | Huang et al. | |
| 2021/0360676 | A1 | 11/2021 | Fakoorian et al. | |
| 2022/0014954 | A1 | 1/2022 | Ibrahim et al. | |
| 2022/0322345 | A1* | 10/2022 | Kwak | H04W 72/0453 |
| 2022/0393716 | A1* | 12/2022 | Park | H04L 5/0012 |
| 2023/0057948 | A1* | 2/2023 | Ly | H04L 1/08 |
| 2023/0239122 | A1* | 7/2023 | Xiong | H04B 1/7143 |
| | | | | 370/280 |
| 2023/0275717 | A1* | 8/2023 | Yao | H04L 5/0048 |
| | | | | 370/329 |
| 2023/0283418 | A1* | 9/2023 | Abdelghaffar | H04L 5/0094 |
| | | | | 370/329 |
| 2023/0284210 | A1* | 9/2023 | Abdelghaffar | H04L 5/14 |
| | | | | 370/329 |
| 2023/0292294 | A1* | 9/2023 | Rudolf | H04L 1/1858 |
| 2024/0137972 | A1* | 4/2024 | Abdelghaffar | H04W 74/0833 |
| 2024/0172199 | A1* | 5/2024 | Jung | H04L 5/0092 |
| 2024/0195545 | A1* | 6/2024 | Shim | H04L 5/0044 |
| 2024/0237055 | A9* | 7/2024 | Abdelghaffar | H04L 5/14 |

FOREIGN PATENT DOCUMENTS

| | | | | |
|---|---|---|---|---|
| WO | WO-2023168161 | A1 * | 9/2023 | H04B 1/54 |
| WO | WO-2024010586 | A1 * | 1/2024 | H04L 5/0007 |
| WO | WO-2024035016 | A1 * | 2/2024 | |

\* cited by examiner

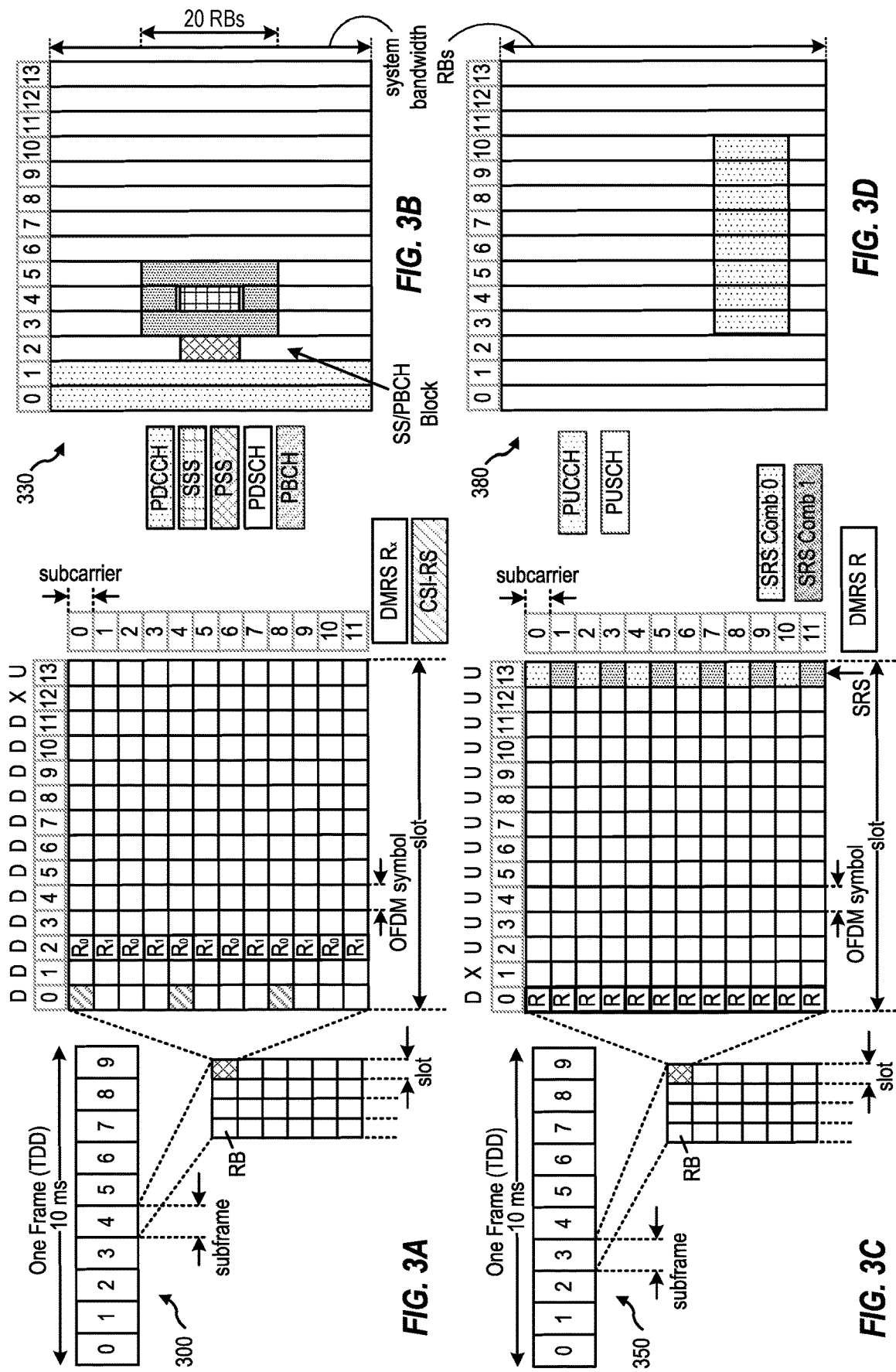

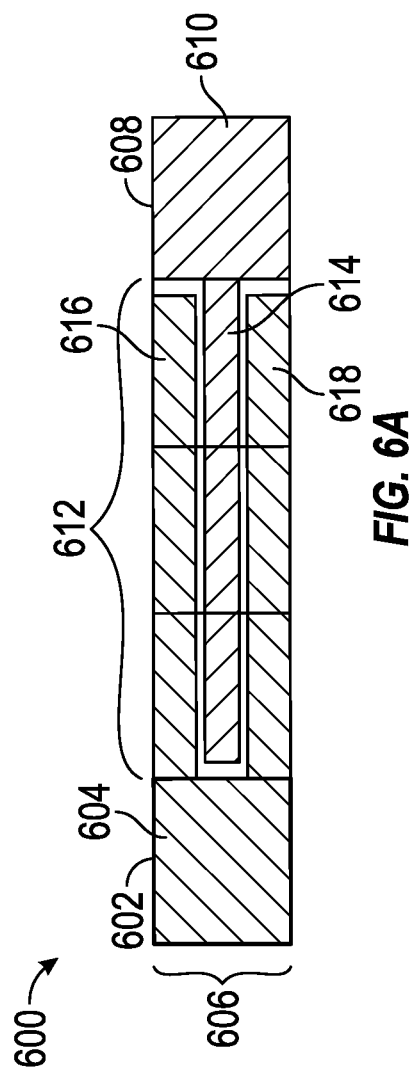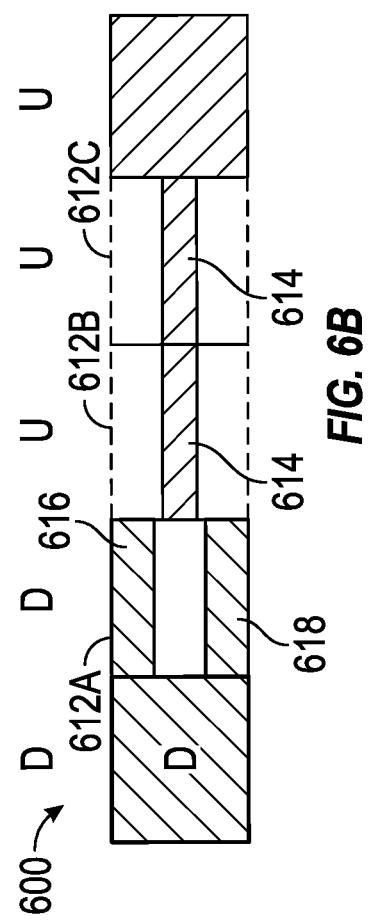
FIG. 6A
FIG. 6B

TECHNIQUES FOR INTER-SLOT AND INTRA-SLOT FREQUENCY HOPPING IN FULL DUPLEX

BACKGROUND

Field of the Disclosure

Aspects of the present disclosure relate to wireless communications, and more particularly, to techniques for inter-slot and intra-slot frequency hopping in full duplex.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment. The method includes receiving scheduling information from a network entity. In some cases, the scheduling information schedules transmission of a plurality of uplink data channel repetitions in a plurality of slots according to a frequency hopping scheme that configures frequency hops between transmissions of repetitions of the plurality of uplink data channel repetitions. Additionally, in some cases, the plurality of slots comprise at least a first full duplex (FD) slot including an uplink subband and a downlink subband of a larger bandwidth part (BWP). Additionally, in some cases, the scheduling information indicates at least one starting resource block (RB) for the plurality of uplink data channel repetitions and at least one RB offset, selected from a set of RB offsets, for the plurality of uplink data channel repetitions. Additionally, the method further includes taking one or more actions related to transmitting, according to the frequency hopping scheme, the plurality of uplink data channel repetitions in the plurality of slots based on the scheduling information.

One aspect provides a method for wireless communication by a user equipment. The method includes transmitting scheduling information to a user equipment (UE). Additionally, in some cases, the scheduling information schedules transmission of a plurality of uplink data channel repetitions in a plurality of slots according to a frequency hopping scheme that configures frequency hops between transmissions of repetitions of the plurality of uplink data channel repetitions. Additionally, in some cases, the plurality of slots comprise at least a first full duplex (FD) slot including an uplink subband and a downlink subband of a larger bandwidth part (BWP). Additionally, in some cases, the scheduling information indicates at least one starting resource block (RB) for the plurality of uplink data channel repetitions and at least one RB offset, selected from a set of RB offsets, for the plurality of uplink data channel repetitions. Additionally, the method further includes taking one or more actions related to receiving, according to the frequency hopping scheme, the plurality of uplink data channel repetitions in the plurality of slots based on the scheduling information.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

FIGS. 6A and 6B illustrate an example slot format, including at least one subband full duplex slot.

DETAILED DESCRIPTION

Figure 1:
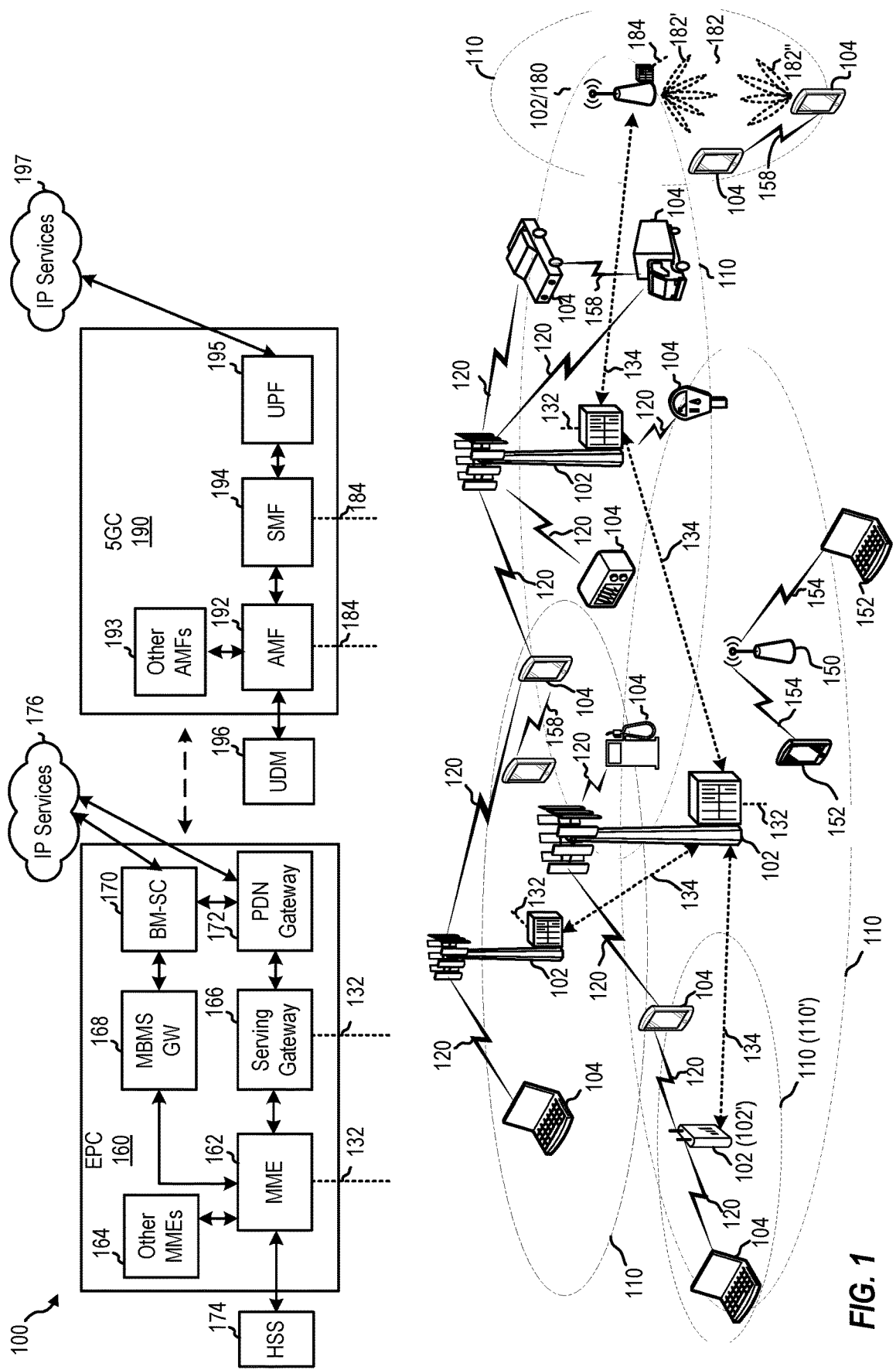
FIG. 1 is a block diagram conceptually illustrating an example wireless communication network.

Aspects of the present disclosure provide apparatuses, methods, processing systems, and computer-readable mediums for inter-slot and intra-slot frequency hopping in full duplex.

A user equipment (UE) in a wireless network may be scheduled to transmit uplink data in a transport block (TB) via a physical uplink shared channel (PUSCH). In some cases, to improve data transmission coverage of uplink transmissions, the UE may repeat transmission of the TB over multiple slots, known as PUSCH repetition. In some cases, multiple copies (e.g., repetitions) may be transmitted within one slot or may be transmitted over multiple slots. In some cases, when transmitting PUSCH, a technique known as frequency hopping may be used, which configures frequency hops between PUSCH transmissions. Different types of frequency hopping may be used. For example, one type of frequency hopping is known as intra-slot frequency hopping in which a frequency hop occurs between portions of a PUSCH transmission within a single slot. Another type of frequency hopping is known as inter-slot frequency hopping in which the frequency hop occurs between slots in which two different PUSCH repetitions are transmitted.

When transmitting PUSCH, these PUSCH transmissions must be transmitted within uplink resources (e.g., an uplink subband) of a slot. In legacy systems, symbols within a slot allocated for PUSCH transmission included only uplink frequency resources (e.g., only an uplink subband). However, in emerging systems, there may be cases in which subband full duplex (SBFD) is supported by a base station within certain slots. SBFD may result, in some cases, in symbols of a slot, in which PUSCH transmissions are to be transmitted, having frequency resources (e.g., uplink subbands) allocated for uplink transmissions as well as frequency resources (e.g., downlink subbands) allocated for downlink transmissions where the frequency resources of the UL and DL subband are non-overlapping. In other words, there may be cases in which frequency resources in a slot may be split among frequency resources for uplink transmissions and frequency resources for downlink transmissions.

SBFD slots may cause issues when transmitting PUSCH with frequency hopping as there may be cases in which, due to a frequency hop, frequency resources over which the PUSCH transmissions are scheduled to be transmitted may not coincide with the frequency resources allocated for the uplink transmission within the SBFD slots. For example, in some cases, the frequency resources for transmitting these PUSCH transmissions may occur within frequency resources allocated to downlink transmissions. If the UE were to proceed with transmitting these PUSCH transmissions, the PUSCH transmissions may cause interference to these downlink transmissions. This interference may lead to both the PUSCH transmissions and downlink transmissions having to be retransmitted, unnecessarily wasting time and frequency resources within the wireless network and power resources within the devices performing the retransmissions. In other cases, if the UE were to decide to drop the transmission of these PUSCH transmissions, latency associated with transmitting these PUSCH transmissions would increase, causing poor user experience.

Therefore, aspects of the present disclosure provide techniques for helping to resolve the issues described above with respect to using inter-slot and intra-slot frequency hopping to transmit PUSCH transmissions in full duplex slots (e.g., SBFD slots). For example, these techniques may include techniques for increasing the probability that frequency resources for PUSCH transmissions coincide with an uplink subband of a slot. In some cases, the techniques may involve increasing the number of frequency offsets that may be configured, defining different frequency offsets for SBFD slots, and/or determining starting RBs based on the size of the uplink subband within a bandwidth part (BWP) rather than the size of the BWP itself. Additionally, the techniques may include techniques to help avoid dropping PUSCH transmissions/repetitions if, by chance, the frequency resources for these PUSCH transmissions/repetitions (partially) fall outside the uplink subband of a slot.

By helping to increase the probability that the frequency resources for transmitting PUSCH coincide with an uplink subband of a slot and avoiding the dropping of PUSCH transmissions, wasted time, frequency, and power resources may be reduced as the number of retransmissions of PUSCH may be reduced. Additionally, data transmission coverage and latency of data transmitted on the PUSCH may be improved when SBFD slots are used by avoiding the dropping of PUSCH transmissions.

Introduction to Wireless Communication Networks

FIG. 1 depicts an example of a wireless communication network 100, in which aspects described herein may be implemented.

Generally, wireless communication network 100 includes various network entities (alternatively, network elements or network nodes), which are generally logical entities associated with, for example, a communication device and/or a communication function associated with a communication device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming. In some cases, base station 180 may transmit a beamformed signal to UE 104 in one or more transmit directions 182′. UE 104 may receive the beamformed signal from the base station 180 in one or more receive directions 182″. UE 104 may also transmit a beamformed signal to the base station 180 in one or more transmit directions 182″. Base station 180 may also receive the beamformed signal from UE 104 in one or more receive directions 182′. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

In various aspects, a network entity or network node can be implemented as an aggregated base station, as a disaggregated base station, an integrated access and backhaul (IAB) node, a relay node, a sidelink node, to name a few examples.

Figure 2:
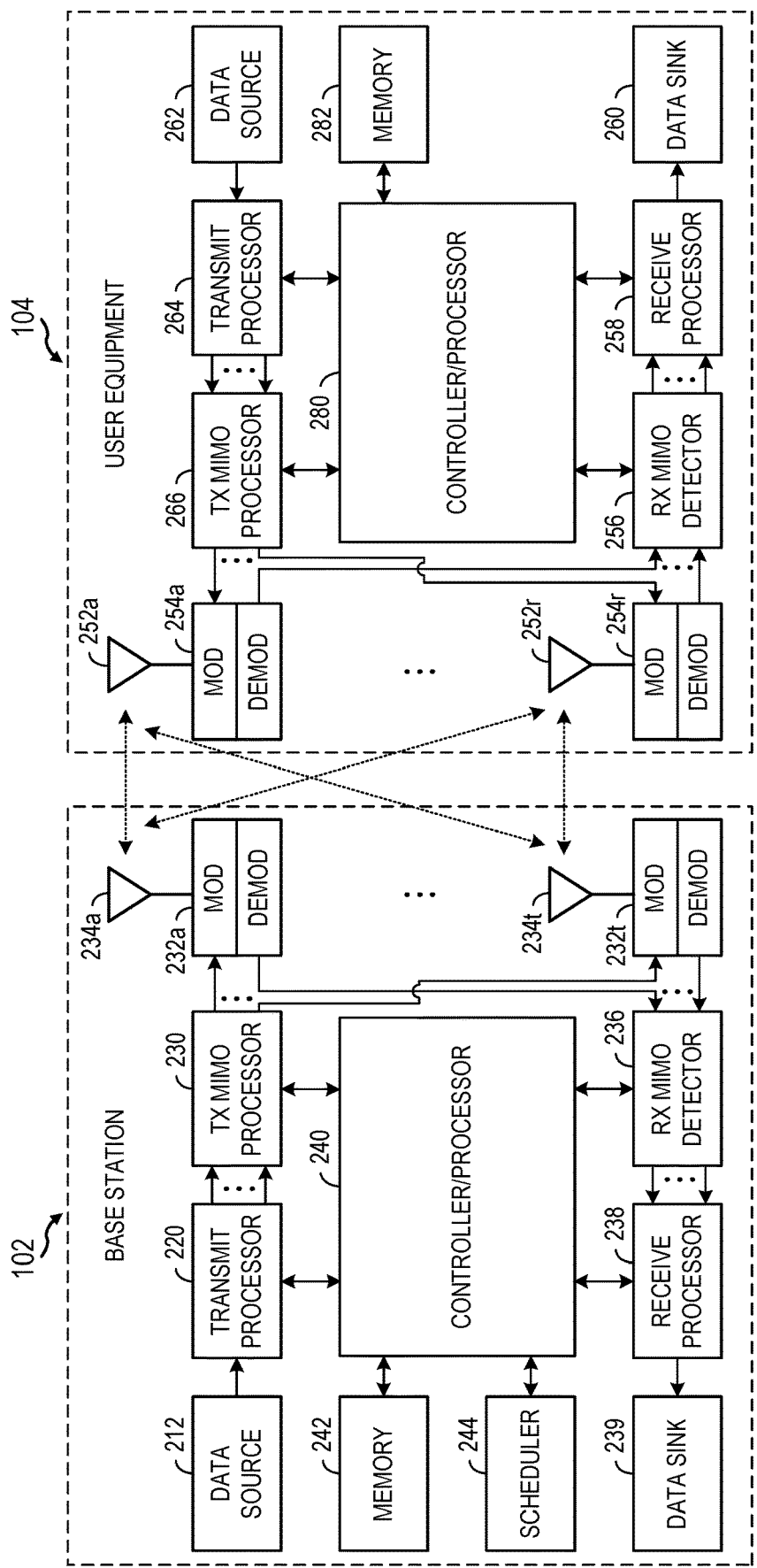
FIG. 2 is a block diagram conceptually illustrating aspects of an example base station and an example user equipment.

FIG. 2 depicts aspects of an example BS 102 and a UE 104.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104. BS 102 includes controller/processor 240, which may be configured to implement various functions described herein related to wireless communications.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260). UE 104 includes controller/processor 280, which may be configured to implement various functions described herein related to wireless communications.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to Multi-Antenna Panel and Full Duplex Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 4A:
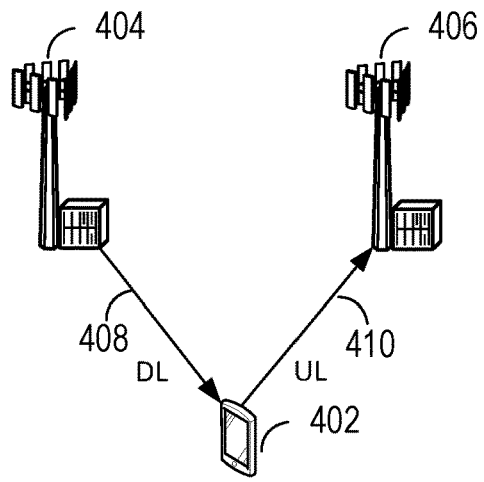
FIGS. 4A, 4B, and 4C illustrates different FD use cases within a wireless communication network
Figure 4B:
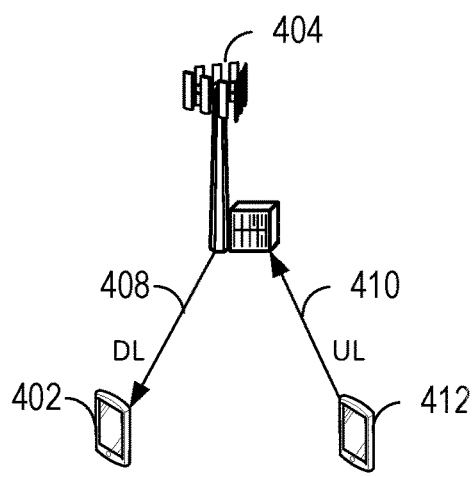
Figure 4C:
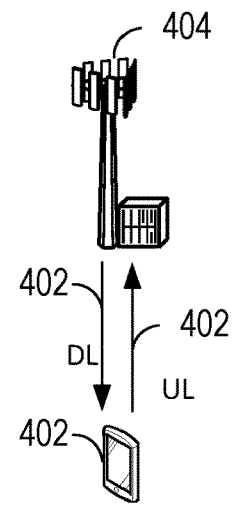

FIGS. 4A, 4B, and 4C illustrates different FD use cases within a wireless communication network, such as the wireless communication network 100. For example, FIG. 4A illustrates a first FD use case involving transmission between one UE 402 and two base stations (or multiple transmission reception points (mTRP)), BS 404 and BS 406. In some cases, UE 402 may be representative of UE 104 of FIG. 1 and BSs 404, 406 may be representative of BS 102 of FIG. 1. As shown, the UE 402 may simultaneously receive DL transmissions 408 from the BS 406 and transmit UL transmissions 410 to the BS 406. In some cases, the DL transmissions 408 and UL transmissions 410 may be performed using different antenna panels to facilitate the simultaneous transmission and reception.

A second FD use case is illustrated in FIG. 4B involving two different UEs and one BS. As illustrated, the UE 402 may receive DL transmissions 408 from the BS 404 while another UE 412 may simultaneously transmit UL transmission 410 to the BS 404. Thus, in this example, BS 404 is conducting simultaneous uplink and downlink communications.

A third FD use case is illustrated in FIG. 4C involving one BS and one UE. As illustrated, the UE 402 may receive DL transmissions 408 from the BS 404 and may simultaneously transmit UL transmissions 410 to the BS 404. As noted above, such simultaneous reception/transmission by the UE 402 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline 5G behavior |
| FD disabled | FD enabled | Use case #1 (FIG. 4A) for mTRP |
| FD enabled | FD disabled | Use case #2 (FIG. 4B) + IAB |
| FD enabled | FD enabled | Use case #3 (FIG. 4C) |

As shown, if FD capability is disabled at both the base station and UE, the baseline 5G behavior may be used (e.g., HD communication). If FD capability is disabled at the BS but enabled at the UE, the UE may operate according to the first example FD use case shown in FIG. 4A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 4B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 4C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by a guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Aspects Related to Inter-Slot and Intra-Slot Frequency Hopping in Full Duplex

In some cases, a user equipment (UE) may be scheduled to transmit uplink data on a physical uplink shared channel (PUSCH). A base station (BS) may schedule uplink transmissions on the PUSCH by transmitting downlink control information (DCI) to the UE that includes a dynamic grant (DG) or may transmit or radio resource control (RRC) signaling to the UE that includes a configured grant (CG).

DGs may include an indication of one or more time and frequency resources for transmitting an uplink transmission on the PUSCH. In some cases, the one or more time and frequency resources may be non-periodic and may be allocated to the UE for a particular uplink transmission. As such, when another uplink transmission needs to be scheduled for the UE, the BS may transmit another dynamic grant with additional scheduling information for this other uplink transmission. Conversely, CGs allocate a periodic set of time and frequency resources to the UE, which may be shared with multiple other UEs. For example, a base station may transmit a CG that allocates the resources to multiple UEs, and the UEs may randomly utilize the resources when they have data to transmit.

When scheduled, the UE may transmit uplink data in a transport block (TB) on the PUSCH. In some cases, to improve data transmission coverage of uplink transmissions, the UE may repeat transmission of the TB over multiple slots, known as PUSCH repetition. In some cases, one TB may be transmitted in one slot and multiple copies (e.g., repetitions) of the TB may be transmitted over multiple slots. The multiple copies/repetitions of the TB may be transmitted using different redundancy versions (RVs).

In some aspects, performance may be improved by transmitting one TB over time resources in multiple slots. In other words, a single TB may span across multiple slots, reducing the modulation and coding scheme (MCS) (e.g., code rate) associated with the TB. The reduced code rate results in increased reliability associated with data transmission. Channel coverage may be improved by repeating the same data (possibly with different RVs) in multiple TBs, allowing a receiver (e.g., BS) to combine the TBs for decoding of the data.

Different types of PUSCH repetition may be used, such as PUSCH repetition type-A and PUSCH repetition type-B. Both PUSCH repetition types may be applicable to DG and CG.

Figure 5A:
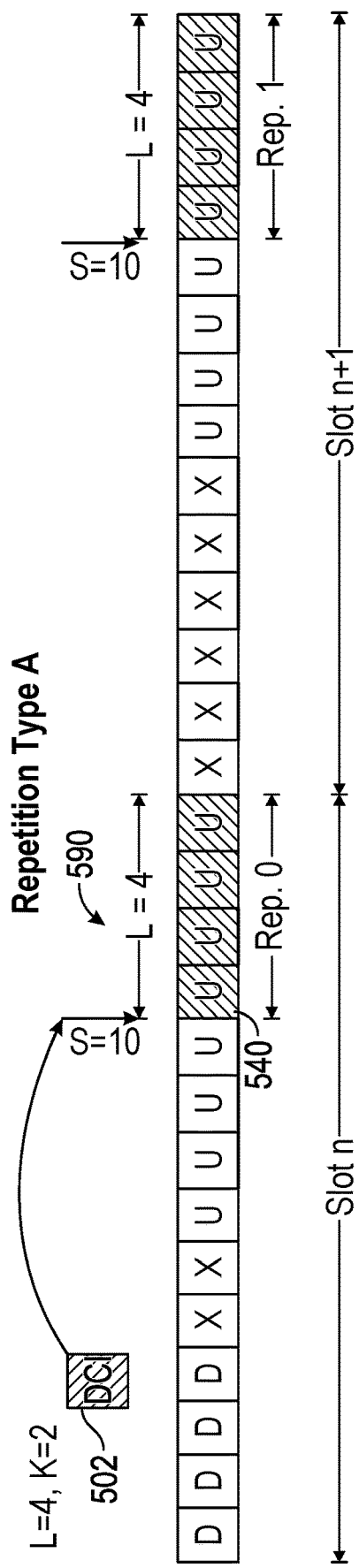
FIGS. 5A and 5B illustrate different examples of physical uplink shared channel (PUSCH) repetition.

FIG. 5A illustrates an example of PUSCH repetition type-A. The symbols shown in FIG. 5A may be either configured for downlink (labeled "D"), configured for uplink (labeled "U"), or configured as a special or flexible symbol (labeled "X") which can be either designated as downlink or uplink. In some cases, a BS may indicate a number of repetitions K to a UE to be applied for PUSCH. If the number of repetitions K is greater than 1, the same start and length indicator (indicated by a start and length indicator value (SLIV)) may be applied across K consecutive slots. SLIV indicates the start symbol and length of PUSCH. For example, DCI 502 may indicate SLIV for PUSCH transmission 590, such as a start symbol 540 (e.g., S=10) with a length L of 4 symbols, as shown in FIG. 5A. As shown, the PUSCH may be transmitted based on the same SLIV in each of the K consecutive slots. For example, repetition 0 of a PUSCH TB may be transmitted in a segment of slot n and repetition 1 of the PUSCH TB may be transmitted in a segment of slot n+1, as shown. As used herein, a segment generally refers to a group of consecutive uplink configured symbols or a group of consecutive downlink configured symbols, as shown in FIG. 5A and FIG. 5B.

Figure 5B:
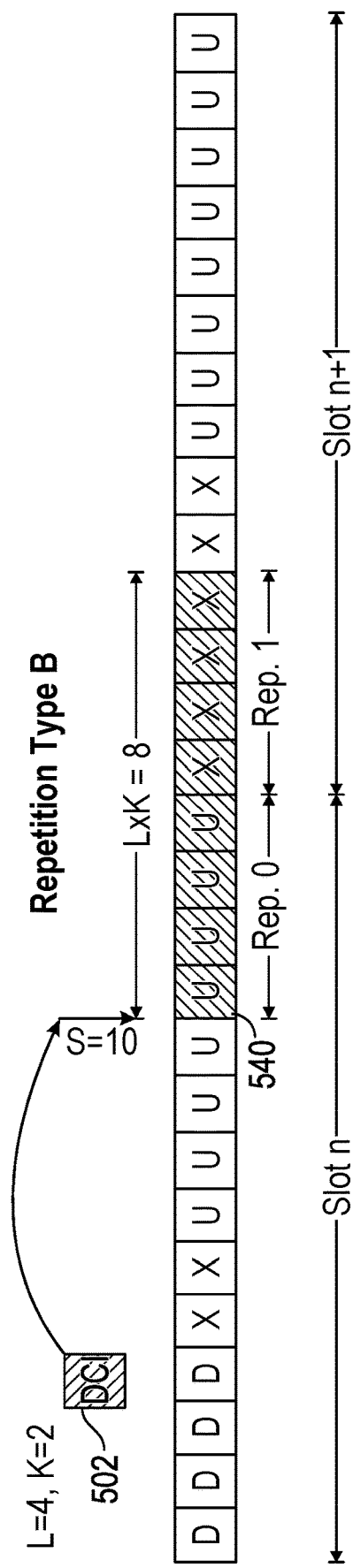

FIG. 5B illustrates an example of PUSCH repetition type-B. The symbols shown in FIG. 5B may be either configured for downlink (labeled "D"), configured for uplink (labeled "U"), or configured as a special or flexible symbol (labeled "X") which can be either designated as downlink or uplink. As shown, the repetitions of a PUSCH TB may be within or across slots. For example, the PUSCH may cross a slot boundary, such as the boundary between slot n and n+1 shown in FIG. 5B.

In some aspects, dynamic indication of a number of repetitions may be implemented. That is, DCI 502 may indicate SLIV for the PUSCH TB repetitions. For example, a start at symbol (S=10) may be indicated with K=2 repetitions, as shown. More generally, DCI 502 may indicate that K nominal repetitions, each with nominal length L, may be sent back-to-back starting from symbol 540 (S=10), where S and L are given by SLIV. Accordingly, as shown in FIG. 5B, repetition 0 may be transmitted in a segment of slot n and repetition 1 may be transmitted in a segment of slot n+1, where the segments are contiguous. Moreover, while FIGS. 5A and 5B have illustrated an example uplink/downlink (U/D) symbol interaction and SLIV configuration to facilitate understanding, any U/D symbol interaction or SLIV configuration may be used.

In some cases, a frequency hopping scheme may be used when transmitting PUSCH. In some cases, this frequency hopping scheme may include inter-slot frequency hopping and/or intra-slot frequency hopping. Inter-slot frequency hopping involves a frequency hop that occurs between PUSCH repetitions transmitted in two different slots. Intra-slot frequency hopping involves a frequency hop that occurs between portions of a PUSCH transmission/repetition transmitted within a single slot.

In some cases, the frequency hopping scheme may be indicated to a UE by a base station using the radio resource control (RRC) parameter frequencyHopping-ForDCIFormat0_1 or by frequencyHopping-ForDCIFormat0_2, which may be configured in pusch-Config for scheduling/activation by DCI format 0_1 and DCI 0_2, respectively. In some cases, for Type 1 CG, the frequency hopping scheme may be given by the parameter frequency Hopping-PUSCHRep-TypeB provided in configuredGrantConfig. In some case, unlike 3rd Generation Global Partnership (3GPP) Release 15 or type-A PUSCH repetition, for PUSCH type-B repetition, type2 CG scheme follows the frequency hopping scheme associated with activation DCI.

In some cases, when intra-slot frequency hopping is used with PUSCH repetition type-A, this intra-slot frequency hopping may be applicable to single-slot or multiple-slot PUSCH transmission. Additionally, intra-slot frequency hopping may only be applicable to resource allocation type 1. Further, intra-slot frequency hopping may be applicable to DG-PUSCH scheduled via DCI format 0_0, 0_1 and 0_2 and CG Type 1 and Type 2.

In some cases, frequency offsets (e.g., resource block (RB) offsets for the second hop) for PUSCH repetitions may be provided by one or more higher layer parameters. For example, for DCI format 0_0 and 0_1 the frequency offsets for PUSCH repetitions may be provided in the parameter frequencyHoppingOffsetLists in puschConfig. For DCI format 0_2, the frequency offsets for PUSCH repetitions may be provided in the parameter frequencyHoppingOffsetList-sDCI-0-2 in puschConfig. Except for a PUSCH scheduled by a random access response (RAR) uplink (UL) grant, a fallback RAR UL grant, or by DCI format 0_0 with CRC scrambled by a temporary cell radio network temporary identifier (TC-RNTI), frequency offset is given by Table 1.

Table 1, below, illustrates frequency offsets PUSCH repetitions for different UL bandwidth part (BWP) sizes (e.g., in a number of physical resource blocks (PRBs)) and the manner in which these frequency offsets may be indicated in configuration information.

TABLE 1

Frequency offset for second hop of PUSCH transmission with frequency hopping

| Number of PRBs in initial UL BWP | Value of $N_{UL,hop}$ hopping bits to indicate frequency offset | Frequency offset for $2^{nd}$ hop |
|---|---|---|
| $N_{BWP}^{size} < 50$ | 0 | $\lfloor N_{BWP}^{size}/2 \rfloor$ |
|  | 1 | $\lfloor N_{BWP}^{size}/4 \rfloor$ |
| $N_{BWP}^{size} \geq 50$ | 00 | $\lfloor N_{BWP}^{size}/2 \rfloor$ |
|  | 01 | $\lfloor N_{BWP}^{size}/4 \rfloor$ |
|  | 10 | $-\lfloor N_{BWP}^{size}/4 \rfloor$ |
|  | 11 | Reserved |

As shown in Table 1, two frequency offsets may be configured for a BWP less than 50 PRBs while four frequency offsets may be configured for a BWP greater than or equal to 50 PRBs. Further, as shown, when the size of the BWP is less than 50 PRBs, one of two higher layer configured offsets may be indicated in an UL grant using $N_{UL\_hop}=1$ bits. Further, when the size of the BWP is greater than or equal to 50 PRBs, one of four higher layer configured offsets is indicated in the UL grant using $N_{UL\_hop}=2$ bits.

As noted above, DCI may include an SLIV that indicates a starting symbol and length of a PUSCH transmission/repetition. In some cases, the DCI may also indicate a starting RB for transmission of PUSCH. However, when frequency hopping is used with PUSCH, the starting RBs for different PUSCH transmission/repetitions may be different. For intra-slot frequency hopping the starting RB for PUSCH transmissions may be determine based on Equation 1, below.

$$RB_{start} = \begin{cases} RB_{start}, & i = 0 \\ (RB_{start} + RB_{offset}) \bmod N_{BWP}^{size}, & i = 1 \end{cases} \quad (1)$$

In Equation 1, i=0 and i=1 are the first hop (e.g., first portion of the PUSCH transmission) and the second hop (e.g., second portion of the PUSCH transmission) respectively, and $RB_{start}$ is the starting RB within the UL BWP as calculated from resource block assignment information of resource allocation type 1. The first portion sometime is referred as first hop of PUSCH transmission and the second portion is referred as second hop of PUSCH transmission. Further, a number of symbols in the first hop may be given by $$\left\lfloor \frac{N_{symb}^{PUSCHs}}{2} \right\rfloor,$$

while the number of symbols in the second hop may be given by $$N_{symb}^{PUSCHs} - \left\lfloor \frac{N_{symb}^{PUSCHs}}{2} \right\rfloor.$$

When transmitting PUSCH repetitions, these PUSCH repetitions must be transmitted within uplink resources (e.g., an uplink subband) of a slot. In legacy systems, transmitting PUSCH within uplink resources was not an issue since frequency resources and symbols within a slot allocated for transmission of PUSCH repetitions included only uplink frequency resources (e.g., only an uplink subband). However, in emerging systems, there may be cases in which subband full duplex (SBFD) is supported by a base station within certain slots. SBFD may result, in some cases, in symbols of a slot, in which PUSCH repetitions are to be transmitted, having frequency resources (e.g., uplink subbands) allocated for uplink transmissions as well as frequency resources (e.g., downlink subbands) allocated for downlink transmissions. In other words, there may be cases in which frequency resources in a slot may be split among frequency resources for uplink transmissions and frequency resources for downlink transmissions.

FIGS. 6A and 6B illustrate an example slot format, including at least one SBFD slot. FIG. 6A is from the perspective of a BS capable of supporting full duplex communication within a slot while FIG. 6B is from the perspective of a UE that is only capable of half duplex communication within a slot.

The slot format 600 of FIG. 6A includes a downlink slot 602 that may be used by the BS to transmit downlink information to the UE. As shown, the downlink slot 602 includes a downlink subband 604 that spans an entire BWP 606. Additionally, as shown, the slot format 600 of FIG. 6A includes an uplink slot 608 that may be used by the UE to transmit uplink information to the BS. As shown, the uplink slot 608 includes an uplink subband 610 that spans the entire BWP 606. Further, as shown, the slot format 600 includes a plurality of SBFD slots 612 that may be used by the BS for transmitting downlink information to the UE as well as receiving uplink information from the UE. As shown, each SBFD slot 612 includes an uplink subband 614 that spans only a portion of the BWP 606. Additionally, each SBFD slot 612 includes a downlink subband 616 and a downlink subband 618, each spanning a different portion of the BWP 606. While the uplink subband 614, downlink subband 616, and downlink subband 618 are illustrated as spanning the entire SBFD slot 612, the uplink subband 614, downlink subband 616, and downlink subband 618 within a SBFD slot 612 may be allocated on a symbol-by-symbol granularity.

As noted above, while the BS may be capable of utilizing the slot format 600 illustrated in FIG. 6A for full duplex communication within the SBFD slots 612, the UE, in some cases, may only be capable of half duplex communication with the SBFD slots 612. For example, as illustrated in FIG. 6B, the UE may only be capable of receiving downlink information from the BS via the downlink subbands 616 and 618 within SBFD slot 612A. Similarly, in SBDF slots 612B and 612C, the UE may only be capable of transmitting uplink information to the BS via the uplink subband 614. In some cases, the uplink subband 614 may have a size of less than 50 PRBs, but there may be cases where it may be larger than 50 PRBs.

SBFD slots may cause issues when transmitting PUSCH repetitions with inter-frequency/intra-frequency hopping as there may be cases in which, due to a frequency hop, frequency resources over which the PUSCH repetitions are scheduled to be transmitted may not coincide with the frequency resources allocated for the uplink transmissions (e.g., in the uplink subband 614) within the SBFD slots. In such cases, if a UE were to proceed ahead with transmitting the PUSCH repetitions via frequency resources that do not coincide with the frequency resources for uplink transmissions in an SBFD slot, these PUSCH repetition transmissions may interfere with downlink transmissions, potentially causing both these PUSCH repetitions and interfered downlink transmissions to have to be retransmitted, resulting in wasted time and frequency resources within a wireless network as well as wasted power resources at the devices performing the retransmissions. In other cases, the UE may decide to drop the PUSCH repetition that does not coincide with the frequency resources for uplink transmissions in the SBFD slot, which may reduce data transmission coverage of data transmitted on the PUSCH and can lead to increase latency and additional retransmissions if the PUSCH data is not received correctly due to the dropped PUSCH repetition.

Therefore, aspects of the present disclosure provide techniques for helping to resolve the issues described above with respect to using an inter-frequency or intra-frequency hopping scheme to transmit PUSCH repetitions in full duplex slots (e.g., SBFD slots). For example, these techniques may include techniques for increasing the probability that frequency resources for PUSCH repetitions coincide with an uplink subband of a slot. More specifically, in some cases, the techniques may involve increasing the number of frequency offsets that may be configured, defining different frequency offsets for SBFD slots, and/or determining starting RBs based on the size of the uplink subband within a BWP rather than the size of the BWP itself. Additionally, the techniques may include techniques to help avoid dropping PUSCH repetitions if, by chance, the frequency resources for these PUSCH repetitions (partially) fall outside the uplink subband of a slot.

By helping to increase the probability that the frequency resources for transmitting PUSCH repetitions coincide with an uplink subband of a slot and avoiding the dropping of PUSCH repetitions, wasted time, frequency, and power resources may be reduced as the number of retransmissions of PUSCH repetitions may be reduced. Additionally, data transmission coverage and latency of data transmitted on the PUSCH may be improved when SBFD slots are used by avoiding the dropping of PUSCH repetitions.

Example Operations for PUSCH Transmission Using Intra-Slot Frequency Hopping

Figure 7:
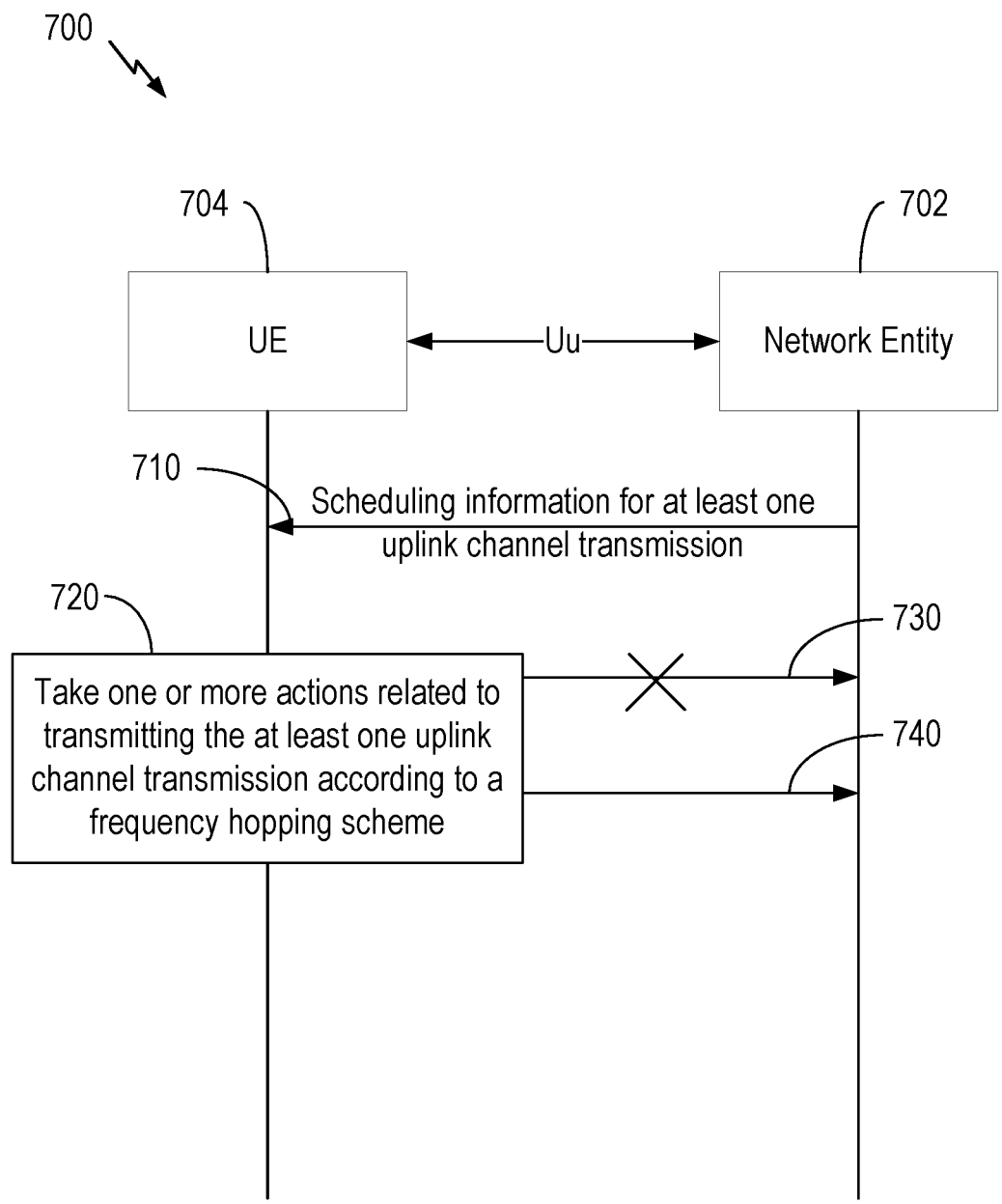
FIG. 7 depicts a process flow for communication in a network between a user equipment and a base station.

FIG. 7 depicts a process flow of operations 700 for communication in a network between a network entity 702 and a user equipment (UE) 704. In some aspects, the network entity 702 may be an example of the BS 102 depicted and described with respect to FIGS. 1 and 2 or a disaggregated base station as discussed with respect to FIG. 21. Similarly, the UE 704 may be an example of UE 104 depicted and described with respect to FIGS. 1 and 2. However, in other aspects, UE 104 may be another type of wireless communication device and BS 102 may be another type of network entity or network node, such as those described herein.

As shown, operations 700 begin at 710 with the UE 704 receiving scheduling information from the network entity 702. In some cases, the scheduling information schedules transmission at least one uplink channel transmission (e.g., PUSCH, PUCCH, etc.) in a full duplex (FD) slot according to a frequency hopping scheme that configures frequency hops between different portions of the at least one uplink channel transmission in the FD slot (e.g., an SBFD slot, such as SBFD slot 612 illustrated in FIGS. 6A and 6B). In some cases, the FD slot includes an uplink subband (e.g., uplink subband 614) and a downlink subband (e.g., downlink subband 616 and/or downlink subband 618) of a larger BWP (e.g., BWP 606). Additionally, in some cases, the scheduling information indicates at least one starting resource block (RB) for the at least one uplink channel transmission and at least one RB offset, selected from a set of RB offsets, for at least one uplink channel transmission. In some cases, the at least one RB offset may be selected from a set of (configurable) RB offsets.

Thereafter, at block 720, the UE 704 takes one or more actions related to transmitting, according to the frequency hopping scheme, the at least one uplink channel transmission in FD slot based on the scheduling information.

In some cases, the scheduling information received at 710 by the UE 704 schedules a first portion of the at least one uplink data channel transmission in the FD slot and a second portion of the at least one uplink data channel transmission in the FD slot. Additionally, in some cases, the scheduling information received at 710 by the UE 704 schedules a frequency hop between the first portion of the at least one uplink channel transmission and the second portion of the uplink channel transmission.

As noted above, the scheduling information may also include an indication of a starting RB and at least one RB offset. In some cases, a first starting RB in the FD slot for the first portion may comprise the starting RB indicated in the scheduling information for the FD slot. Additionally, in some cases, the UE 704 may determine a second starting RB in the FD slot for the second portion based on the at least one RB offset indicated in the scheduling information for the FD slot. For example, in some cases, the UE 704 may apply the RB offset to the indicated starting RB to determine the second starting RB for the second portion of the at least one uplink channel transmission.

In some cases, the BWP of SBFD slots may be expected to comprise a number of RBs less than a first threshold (e.g., 50 RBs) and, as a result an uplink subband (e.g., uplink subband 614) of the SBFD slot may comprise a number of RBs less than a second threshold (e.g., where the second threshold is less than the first threshold). However, there may be cases in which the BWP of the SBFD slots may be larger than 50 PRBs. As discussed above in relation to Table 1, when the size of the BWP is less than 50 PRBs, there may only be two configurable RB offsets that may be applied to the indicated starting RB (e.g., indicated in DCI) for determining the second starting RB for the second portion of the at least one uplink channel transmission when intra-slot frequency hopping is used. In some cases, however, the number of configurable RB offsets for BWPs less than 50 PRBs may not be adequate (e.g., when applied to the indicated starting RB) to ensure that frequency resources for transmitting the second portion of the at least one uplink channel transmission coincide with the uplink subband of the FD slot. In other words, there may be cases in which existing configurable RB offsets may, when applied to the indicated starting RB, result in the frequency resources for transmitting the second portion of the at least one uplink channel transmission falling outside the uplink subband of the first FD slot.

Figure 8A:
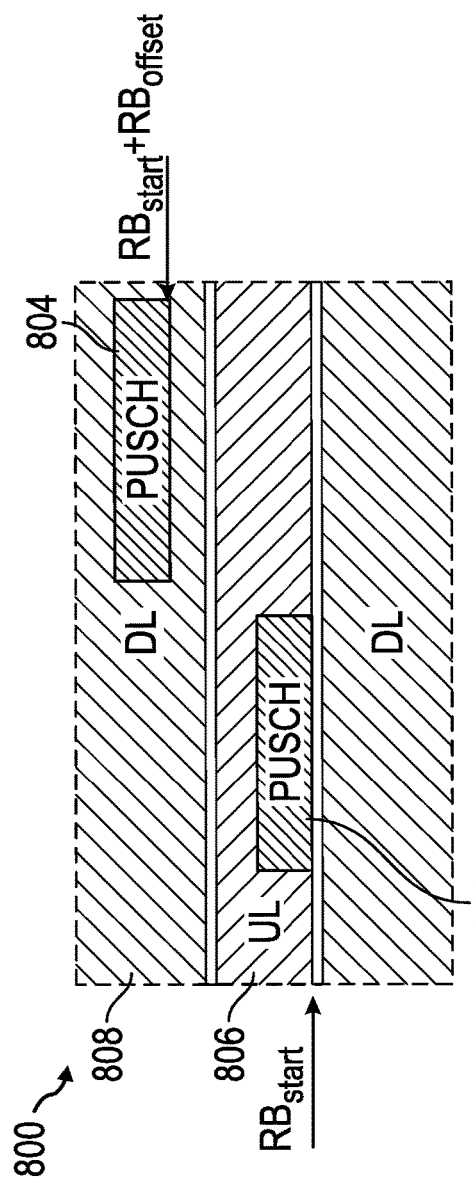
FIG. 8A illustrates an example of when a resource block offset leads to the frequency resources of a PUSCH repetition not coinciding with an uplink subband of a slot.

FIG. 8A illustrates an example of when an RB offset may lead to the frequency resources of the second portion of the at least one uplink channel transmission not coinciding with the uplink subband of the FD slot. For example, as illustrated, the FD slot 800 includes a first portion 802 of the at least one uplink channel transmission and a second portion 804 of the at least one uplink channel transmission. The FD slot 800 may be associated with a BWP that is less than the first threshold (e.g., 50 RBs) and, as a result, an uplink subband 806 that includes a number of RBs that is less than a second threshold.

As shown, the first hop or first portion 802 begins at a starting RB ($RB_{start}$) within an uplink subband 806 of the FD slot 800. Further, as shown, in order to determine the starting RB for the second portion 804 (e.g., second hop), the UE 704 applies the indicated at least one RB offset (e.g., $RB_{offset}$) to the indicated starting RB (e.g., $RB_{start}$), which results in frequency resources for transmitting the second portion 804 falling within the downlink subband 808 of the FD slot 800. In some cases, this may occur due to the limited number of frequency offsets that the network entity 702 may configure (e.g., two RB offsets) for when the BWP is less than the first threshold of RBs and when the number of RBs of the uplink subband of the FD is less than the second threshold. Further, when this occurs with intra-slot frequency hopping (e.g., when at least one portion of the at least one uplink channel transmission within the FD slot 800 falls outside the uplink subband 806 of the FD slot 800), both the first portion 802 and the second portion 804 must be dropped from transmission within the FD slot 800, resulting in utilized resources and increasing latency associated with data transmitted within the at least one uplink channel transmission.

Accordingly, in some cases, to help avoid situations in which the frequency offsets of the second portion of the at least one uplink channel transmission do not coincide with the uplink subband of the FD slot due to the limited number of configurable RB offsets, in some cases, the number of configurable RB offsets for when the number of RBs of the uplink subband of the FD slot is less than the second threshold (or when the number of RBs of the BWP is less than the first threshold) may be increased to greater than two configurable RB offsets. In other words, based on the BWP of the FD slot including a number of RBs less than the first threshold and/or the uplink subband of the FD slot comprising the number of RBs less than the second threshold, the set of RB offsets (e.g., from which the indicated at least one RB offset is selected) comprises greater than two RB offsets. In some cases, increasing the number of configurable RB offsets (e.g., to greater than two) may increase the probability that an adequate RB offset may be configured to ensure the frequency resources of the second portion coincide with the uplink subband of the FD slot.

In other cases, to help avoid situations in which the frequency offsets of the second portion of the at least one uplink channel transmission do not coincide with the uplink subband of the FD slot, a number of configurable frequency offsets may be increased to lower the granularity, allowing the network entity 702 to more accurately select an RB offset such that the frequency resources for the second portion of the at least one uplink channel transmission coincide with the uplink subband of the FD slot. In some cases, the RB offsets for FD slots may be different than the RB offsets for non-FD slots. In other words, the set of RB offsets (e.g., from which the at least one RB offset indicated in the scheduling information is selected from for the FD slot) may be different from another set of RB offsets for a non-FD slot. In some cases, the set of RB offsets for the first FD slot may include RB offsets that are configured to help ensure that the frequency resources for the second portion of the at least one uplink channel transmission coincide with the uplink subband of the FD slot.

Tables 2 and 3, below, illustrates how these additional/ different RB offsets may be indicated within the scheduling information received at 710 by the UE 704, for example, using the parameter $N_{UL\_hop}$ discussed above. As shown in Table 2, an explicit indication via two bits may be included the scheduling information (e.g., $N_{UL\_hop}$=2 bits) and may be used to indicate different RB offsets for different types of slots (e.g., non-SBFD and SBFD slots). For example, as shown, when the slot type is a non-SBFD slot, the scheduling information may indicate one of two configurable non-SBFD RB offsets, such as FH_RBOffset_1 or FH_RBOffset_2 using bit values 00 and 01, respectively. Alternatively, when the slot type comprises an SBFD slot, the scheduling information may indicate one of four configurable SBFD RB offsets, such as FH_RBOffset_SBFD_1, FH_RBOffset_SBFD_2, FH_RBOffset_SBFD_3, or FH_RBOffset_SBFD_4 using bit values 00, 01, 10, or 11, respectively.

TABLE 2

Explicit indication of RB offset for second hop of PUSCH transmission with frequency hopping

| $N_{UL\_hop}$ = 2 bits | frequencyHopping-OffsetLists | frequencyHopping-OffsetLists_SBFD |
|---|---|---|
| 00 | FH_RBOffset_1 | FH_RBOffset_SBFD_1 |
| 01 | FH_RBOffset_2 | FH_RBOffset_SBFD_1 |
| 10 | | FH_RBOffset_SBFD_1 |
| 11 | | FH_RBOffset_SBFD_1 |

As shown in Table 2, a first bit and a second bit are necessary to be able to indicate up to the four possible SBFD RB offsets. More generally, in some cases, the at least one RB offset may be indicated in the scheduling information via a dedicated bitfield that includes a plurality of bits (e.g., two or more bits).

In some cases, rather than using two explicit bits to indicate the additional/different RB offsets, the scheduling information may, as shown in Table 3, include only a first bit and the second bit may be implicitly determined by the UE 704 based on other information, such as a size of an uplink subband within a particular slot. For example, as shown below in Table 3, the parameter $N_{UL\_hop}$ within the scheduling information may include a dedicated bitfield (e.g., including one or more bits), such as the underlined zeros and ones in Table 3. To determine which RB offset is being configured, an additional bit (e.g., the non-underlined bits in Table 3) may be implicitly determined by the UE 704 based on other signaling such as the size of the uplink subband.

TABLE 3

Implicit indication of RB offset for second hop of PUSCH transmission with frequency hopping

| $N_{UL\_hop}$ = 1 explicit bits + 1 implicit bit | frequencyHopping-OffsetLists | frequencyHopping-OffsetLists_SBFD |
|---|---|---|
| 0<u>0</u> | FH_RBOffset_1 | FH_RBOffset_SBFD_1 |
| 0<u>1</u> | FH_RBOffset_2 | FH_RBOffset_SBFD_1 |
| 1<u>0</u> | | FH_RBOffset_SBFD_1 |
| 1<u>1</u> | | FH_RBOffset_SBFD_1 |

In other cases, to help avoid situations in which the frequency offsets of the second portion of the at least one uplink channel transmission do not coincide with the uplink subband of the FD slot, the size of the uplink subband of the FD slot may be taken into account when determining the second starting RB for the second portion of the at least one uplink channel transmission. For example, as discussed above, when determining the starting RB for a "second hop" transmission (e.g., second portion of the at least one uplink channel transmission), Equation 1 may be used. As can be seen, Equation 1 applies a modulo operation involving the size of an active BWP (e.g., in which the portions of the at least one uplink channel transmission are to be transmitted). However, because a BWP of FD slots (e.g., SBFD slots) may be partitioned into different uplink and downlink subbands, strictly determining the starting RB for a "second hop" (e.g., second portion) according Equation 1 may lead to the frequency resources for this "second hop" (e.g., second portion) falling outside of the uplink subband of the BWP within an FD slot. Accordingly, to help resolve this issue, rather than applying a modulo operation involving the entire size of the active BWP, in some cases, a modulo operation involving only the size of the uplink subband may be performed, as shown in Equation 2.

$$RB_{start} = \begin{cases} RB_{start}, & i = 0 \\ (RB_{start} + RB_{offset}) \bmod N_{ULSB}^{size}, & i = 1 \end{cases} \quad (2)$$

Figure 8B:
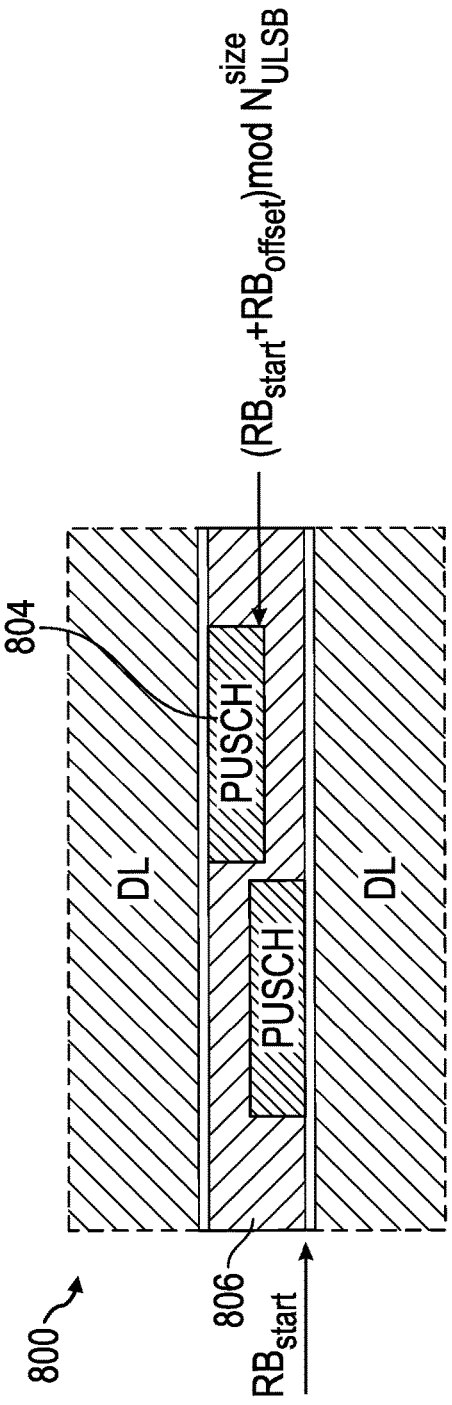
FIG. 8B illustrates an example of frequency resources of a PUSCH repetition coinciding with an uplink subband of a slot.

As shown in Equation 2, the first starting RB for the first repetition (i=0) is the starting RB ($RB_{start}$) indicated in the scheduling information. However, to determine the second starting RB for the second portion of the at least one uplink channel transmission (i=1), the UE 704 may apply (e.g., add) the at least one RB offset (e.g., RB offset) to the starting RB ($RB_{start}$) and apply a modulo operation involving the size of only the uplink subband of the FD slot, which may help to increase the probability that the frequency resources of the second portion (at least partially) coincide with the uplink subband of the FD slot. For example, as shown in FIG. 8B, by using Equation 2 to determine the second starting RB for the second portion 804, the frequency resources of the second portion 804 may coincide with the uplink subband 806 of the FD slot 800.

While the techniques described above may improve the probability that the frequency resources of the second portion of the at least one uplink channel transmission coincide with the uplink subband of the FD slot, there may be cases where at least a part of the second repetition is scheduled to occur outside of the uplink subband of the FD slot. When this occurs, the UE 704 would normally have to drop both the first portion of the at least one uplink channel transmission and the second portion of the at least one uplink channel transmission from being transmitted within the FD slot. For example, based on a determination that part of the second portion of the at least one uplink channel transmission is scheduled to occur outside of the uplink subband of the FD slot, taking the one or more actions at 920 in FIG. 7 may include dropping the first portion of the at least one uplink channel transmission and the second portion of the at least one uplink channel transmission from being transmitted in the FD slot as shown at 730 in FIG. 7. As noted above, dropping transmission of the first portion and the second portion of the at least one uplink channel transmission is disadvantageous (e.g., wastes resources). Thus, the UE 704 may be configured to perform certain techniques to help avoid dropping the first portion and the second portion from being transmitted.

In some cases, these techniques may include ignoring the frequency hop scheduled to occur between the first portion and the second portion. For example, in some cases, based on the determination that the part of the second portion of the at least one uplink channel transmission is scheduled to occur outside of the uplink subband of the FD slot, taking the one or more actions comprises ignoring the frequency hop scheduled between the first portion of the at least one uplink channel transmission and the second portion of the at least one uplink channel transmission. Based on the UE 704 ignoring the frequency hop, the UE 704 may then transmit the first portion of the at least one uplink channel transmission and the second portion of the at least one uplink channel transmission based on the at least one starting RB within the FD slot. The network entity 702 may similarly ignore the frequency hop scheduled between the first portion of the at least one uplink channel transmission and the second portion of the at least one uplink channel transmission and receive the first portion of the at least one uplink channel transmission and the second portion of the at least one uplink channel transmission based on the at least one starting RB within the FD slot.

In some cases, the UE 704 may decide to proceed ahead with transmitting the first portion and the second portion (e.g., even though a part of the second portion of the at least one uplink channel transmission does not coincide with the uplink subband of the first FD slot) when a number of remaining RBs of the second portion that do coincide with the uplink subband of the FD slot is greater than a second threshold number of RBs.

For example, in some cases, the UE 704 may receive, from the network entity 702, an indication of a threshold number of RBs. In some cases, the UE 704 may receive the indication of the threshold number of RBs in the scheduling information or some separate signaling from the network entity 702. Thereafter, the UE 704 may determine whether a number of RBs in the part of the second portion of the at least one uplink channel transmission occurring outside of the uplink subband of the FD slot is greater than the threshold number of RBs.

In some cases, when, based on the determination, the number of RBs in the part of the second portion of the at least one uplink channel transmission occurring outside the uplink subband of the FD slot is greater than the threshold number of RBs, taking the one or more actions in block 720 of FIG. 7 may include dropping the first portion of the at least one uplink channel transmission and the second portion of the at least one uplink channel transmission from being transmitted in the FD slot, as shown at 730 in FIG. 7. In other cases, when, based on the determination, the number of RBs in the part of the second portion of the at least one uplink channel transmission occurring outside the uplink subband of the FD slot is not greater than the threshold number of RBs, taking the one or more actions in block 720 of FIG. 7 may include puncturing the number of RBs scheduled to occur outside the uplink subband and transmitting at least a remaining number of RBs of the second portion of the at least one uplink channel transmission within the uplink subband of the FD slot based on the second starting RB. In some cases, the UE 704 may also transmit the first portion of the at least one uplink channel transmission within the uplink subband of the FD slot based on the first starting RB, as shown at 740 in FIG. 7.

In some cases, rather than dropping the first portion of the at least one uplink channel transmission and the second portion of the at least one uplink channel transmission when the part of the second portion does not coincide with the uplink subband of the FD slot, the UE 704 may be configured to apply an (additional) offset to the second starting RB of the second portion such that the second portion is fully contained in the uplink subband of the FD slot. For example, in some cases, the UE 704 may be configured to determine the second starting RB for the second portion of the at least one uplink channel transmission using techniques described above (e.g., by applying an RB offset to the indicated starting RB in the scheduling information). When the (at least the part of the) second portion of the at least one uplink channel transmission falls outside the uplink subband of the first FD slot, the UE 704 may apply an additional offset to help ensure that the frequency resources of the second portion are fully contained within the uplink subband of the FD slot. In such cases, after applying the (additional) offset, taking the one or more actions in block 720 of FIG. 7 may include, as shown at 740, transmitting the first portion of the at least one uplink channel transmission in the FD slot based on the first starting RB and transmitting the second portion of the at least one uplink channel transmission in the FD slot based the second starting RB and applied (additional) offset.

In some cases, rather than dropping the first portion of the at least one uplink channel transmission and the second portion of the at least one uplink channel transmission when the part of the second portion does not coincide with the uplink subband of the FD slot, the UE 704 may be configured to determine the second starting RB based on a "virtual starting RB" rather than the starting RB indicated in the scheduling information. For example, in some cases, this "virtual starting RB" may be a first RB of the uplink subband of the FD slot. The UE 704 may then apply the indicated at least one RB offset from the scheduling information to this "virtual starting RB" to determine the second starting RB for the second portion of the at least one uplink channel transmission. In such cases, after determining the second starting RB for the second portion of the at least one uplink channel transmission based on the "virtual starting RB", taking the one or more actions in block 720 of FIG. 7 may include, as shown at 740, transmitting the first portion of the at least one uplink channel transmission in the FD slot based on the first starting RB and transmitting the second portion of the at least one uplink channel transmission in the FD slot based on second starting RB.

Techniques for PUSCH Repetition Transmission Using Inter-Slot Frequency Hopping

Figure 9:
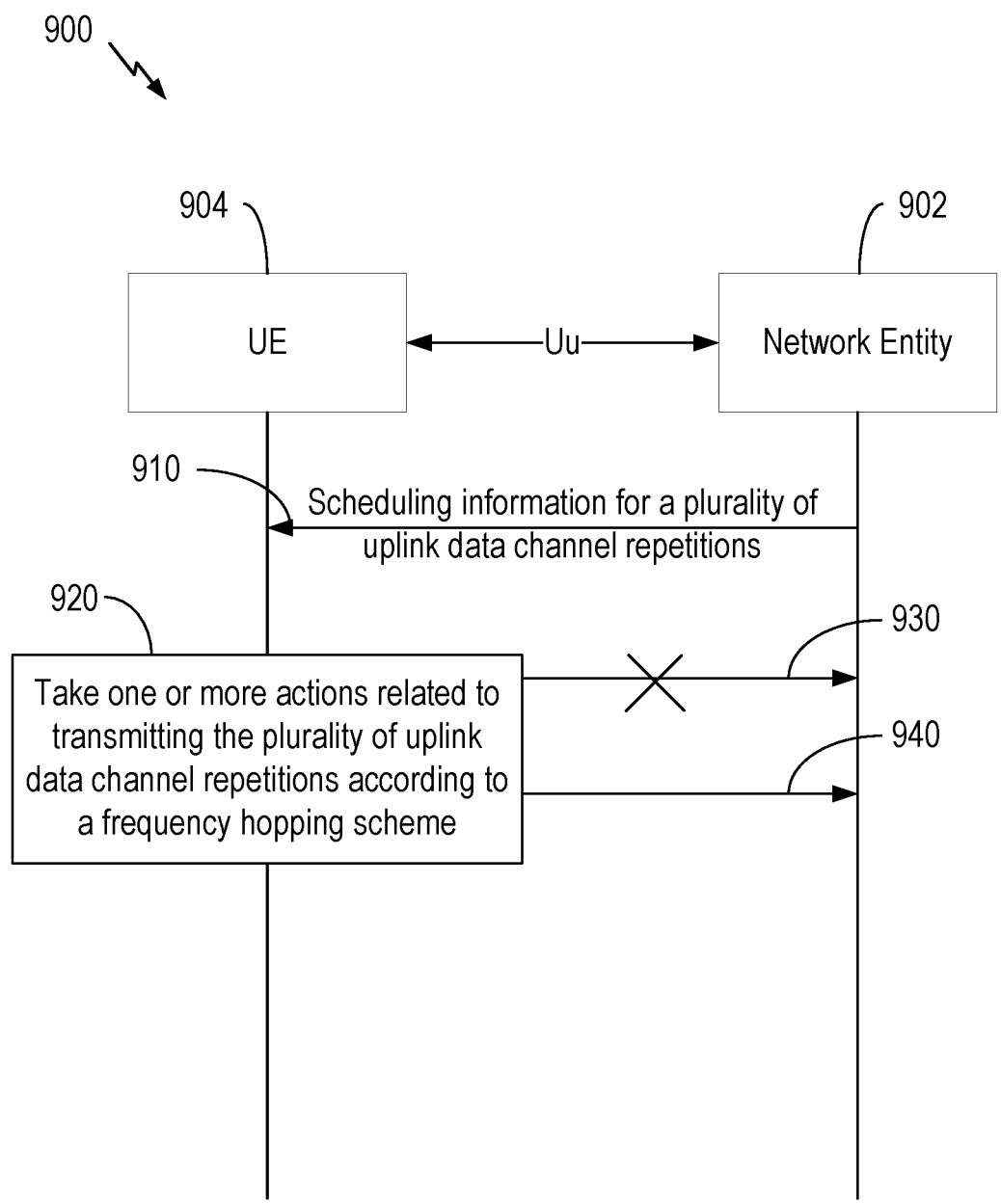
FIG. 9 depicts a process flow for communication in a network between a user equipment and a base station.

FIG. 9 depicts a process flow of operations 900 for communication in a network between a network entity 902 and a user equipment (UE) 904. In some aspects, the network entity 902 may be an example of the BS 102 depicted and described with respect to FIGS. 1 and 2 or a disaggregated base station as discussed with respect to FIG. 21. Similarly, the UE 904 may be an example of UE 104 depicted and described with respect to FIGS. 1 and 2. However, in other aspects, UE 104 may be another type of wireless communication device and BS 102 may be another type of network entity or network node, such as those described herein.

As shown, operations 900 begin at 910 with the UE 904 receiving scheduling information from the network entity 902. In some cases, the scheduling information schedules transmission of a plurality of uplink data channel repetitions (e.g., PUSCH repetitions) in a plurality of slots according to a frequency hopping scheme (e.g., intra-slot and/or inter-slot frequency hopping) that configures frequency hops between transmissions of repetitions of the plurality of uplink data channel repetitions. In some cases, the plurality of slots comprise at least a full duplex (FD) slot (e.g., an SBFD slot, such as SBFD slot 612 illustrated in FIGS. 6A and 6B) including an uplink subband (e.g., uplink subband 614) and a downlink subband (e.g., downlink subband 616 and/or downlink subband 618) of a larger BWP (e.g., BWP 606). Additionally, in some cases, the scheduling information indicates at least one starting RB for the plurality of uplink data channel repetitions and at least one RB offset for the plurality of uplink data channel repetitions. In some cases, the at least one RB offset may be selected from a set of (configurable) RB offsets. Additionally, in some cases, the scheduling information may also indicate a number of repetitions in the plurality of uplink data channel repetitions.

Thereafter, at block 920, the UE 904 takes one or more actions related to transmitting, according to the frequency hopping scheme, the plurality of uplink data channel repetitions in the plurality of slots based on the scheduling information.

In some cases, the scheduling information received at 910 by the UE 904 schedules repetitions of the plurality of uplink data channel repetitions in different slots of the plurality of slots. In such cases, when frequency hopping is used, a frequency hop may occur between repetitions occurring in different slots, known as inter-slot frequency hopping.

In the case of inter-slot frequency hopping, the starting RB during slot ng for a PUSCH repetition may depend on whether slot $n_s^\mu$ is even or odd and may be given by Equation 2, below.

$$RB_{start}(n_s^\mu) = \begin{cases} RB_{start}, & n_s^\mu \bmod 2 = 0 \\ (RB_{start} + RB_{offset}) \bmod N_{BWP}^{size}, & n_s^\mu \bmod 2 = 1 \end{cases} \quad (3)$$

In Equation 3, $n_s^\mu$ is the current slot number within a radio frame that a multi-slot PUSCH transmission can take place, $RB_{start}$ is the starting RB within the UL BWP, as calculated from the resource block assignment information of resource allocation type 1, and $RB_{offset}$ is the frequency offset in RBs between two PUSCH repetitions.

Accordingly, in view of Equation 3, when inter-slot frequency hopping is used, the UE 904 may determine a starting RB in in at least the FD slot for a repetition of the plurality of uplink data channel repetitions based on one of the at least one starting RB indicated in the scheduling information or the at least one starting RB indicated in the scheduling information and the at least one RB offset indicated in the scheduling information.

According to aspects, whether the starting RB is determined based on the at least one starting RB or the at least one starting RB and the at least one RB offset depends on whether the FD slot is an odd slot or an even slot, as shown in Equation 3. For example, when the FD slot comprises an even slot, the starting RB in the FD slot for the repetition comprises the at least one starting RB indicated in the scheduling information. Alternatively, when the FD slot comprises an odd slot, the starting RB in the FD slot for the repetition is based on the at least one starting RB indicated in the scheduling information and the at least one RB offset indicated in the scheduling information.

As can be seen, the starting RB of the repetition may vary depending on whether a slot is odd or even. Moreover, the position of the uplink subband within a slot may vary as well. Due to the variation in starting RB positions and the positions of the uplink subbands within slots, there may be instances in which frequency resources of a repetition (e.g., as defined by the starting RB, RB offset, and a number of RBs allocated to the repetition) do not coincide with the uplink subband of a slot, such as the first FD slot. Moreover, this issue can arise in slots in which the position of the uplink subband is the same between slots given the variation in starting RBs between even and odd slots in Equation 3.

Figure 10:
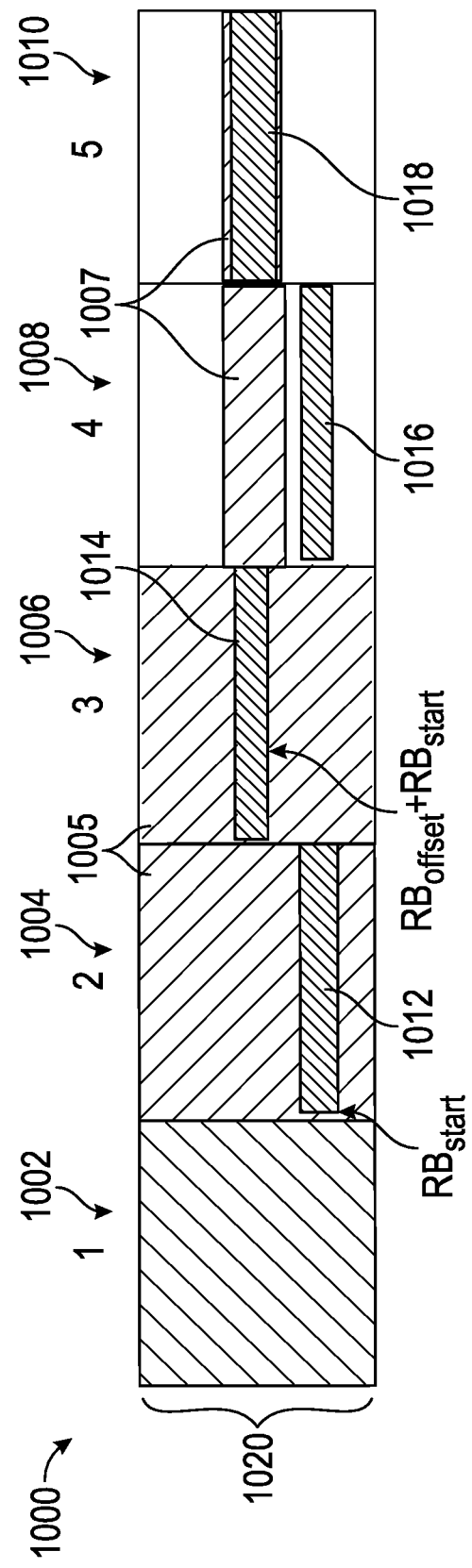
FIG. 10 illustrates a slot format including SBFD slots for transmitting PUSCH repetitions.

An example of this variation is illustrated in FIG. 10. For example, FIG. 10 illustrates a slot format 1000 comprising a plurality of slots. The plurality of slots include a non-FD downlink slot 1002, a first non-FD uplink slot 1004, a second non-FD uplink slot 1006, a first FD slot 1008, and a second FD slot 1010. As shown, an uplink subband 1005 of the first non-FD uplink slot 1004 and the second non-FD uplink slot 1006 spans an entire BWP 1020. In contrast, an uplink subband 1007 of the first FD slot 1008 and the second FD slot 1010 only span a limited portion of the BWP 1020. As a result, the position of the uplink subband varies between the slots 1004, 1006, 1008, and 1010.

Further, as shown in FIG. 10, a first repetition 1012 is scheduled in the first non-FD uplink slot 1004, a second repetition 1014 is scheduled in the second non-FD uplink slot 1006, a third repetition 1016 is scheduled in the first FD slot 1008, and a fourth repetition is scheduled in the second FD slot 1010.

Additionally, as shown in FIG. 10, because the first non-FD uplink slot 1004 and the first FD slot 1008 are even slots (e.g., slots #2 and #4, respectively, of the slot format 1000), the starting RB of the first repetition 1012 and the third repetition 1016 is the starting RB (e.g., $RB_{start}$) indicated in the scheduling information. Conversely, the starting RB of the second repetition 1014 in the second non-FD uplink slot 1006 and the fourth repetition in the second FD slot 1010 is $RB_{start}+RB_{offset}$ since the second non-FD uplink slot 1006 and the second FD slot 1010 are an odd slots (e.g., slot #3 and #5, respectively, of the slot format 1000). Accordingly, as can be seen, the starting RBs for the repetitions in FIG. 10 vary depending on whether the slots are odd or even.

While the variation in the starting RBs for the first repetition 1012 and the second repetition 1014 may not cause issues with the frequency resources associated with these repetitions coinciding with the uplink subband 1005 of the first non-FD uplink slot 1004 and the second non-FD uplink slot 1006 (e.g., since the uplink subband 1005 span the entire BWP 1020), the variation in starting RBs may cause issues with some FD slots since the uplink subbands of these slots do not span the entire BWP 1020. However, due to the alternating nature of the starting RB for even and odd slots, these issues may not arise in all FD slots.

For example, as shown, the starting RB for the third repetition 1016 is $RB_{start}$ since the first FD slot 1008 is an even slot. As a result, frequency resources for transmitting the third repetition 1016 in the first FD slot 1008 fall outside of the uplink subband 1007 of the first FD slot 1008. Conversely, the starting RB for the fourth repetition 1018 is $RB_{start}+RB_{offset}$ since the second FD slot 1010 is an odd slot. In this case, the starting RB for the fourth repetition 1018 coincides with the uplink subband 1007 of the second FD slot 1010.

As noted above, the scheduling information received at 910 by the UE 904 schedules repetitions of the plurality of uplink data channel repetitions in different slots of the plurality of slots, including a first repetition in a non-FD slot and a second repetition in the FD slot In some cases, the first repetition in the non-FD slot is associated with the least one starting RB indicated in the scheduling information and the second repetition in the FD slot is associated with a second starting RB.

In some cases, the UE 904 may determine the second starting RB associated with the second repetition in the FD slot based on the at least one starting RB indicated in the scheduling information or based on the at least one starting RB indicated in the scheduling information and the at least one RB offset indicated in the scheduling information. In some cases, whether the second starting RB is determined based on the at least one starting RB or the at least one starting RB and the at least one RB offset depends on whether the FD slot is an odd slot or an even slot, as shown in Equation 3. For example, when the FD slot comprises an even slot, the second starting RB in the FD slot associated with the second repetition comprises the at least one starting RB indicated in the scheduling information. Further, when the FD slot comprises an odd slot, the second starting RB in the FD slot associated with the second repetition is based on the at least one starting RB indicated in the scheduling information and the at least one RB offset indicated in the scheduling information.

Thereafter, the UE 904 may determine a set of frequencies over which the second repetition is to be transmitted in the FD slot based, at least, on the second starting RB. In some cases, the UE 904 may determine that the set of frequencies over which the second repetition is to be transmitted in the FD slot do not coincide with the uplink subband of the FD slot. In some cases, to determine that the set of frequencies over which the second repetition is to be transmitted in the FD slot do not coincide with the uplink subband of the FD slot, the UE may first determine a frequency segment of the FD slot corresponding to the uplink subband.

Figure 11:
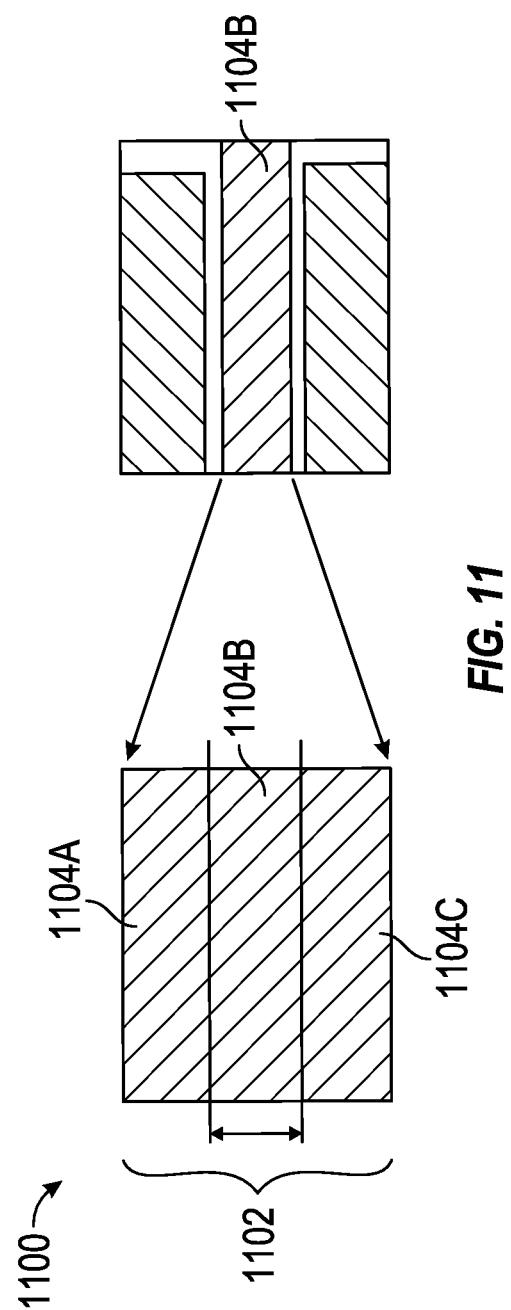
FIG. 11 illustrates an example of dividing a bandwidth part (BWP) into a plurality of frequency segments.

For example, in some cases, as illustrated in FIG. 11, the UE 904 may divide a BWP of the UL subband 1102 of the FD slot 1100 into a plurality of frequency segments, such as frequency segments 1104A, 1104B, and 1104C. Each frequency segment may be of a size equal to or approximately equal to an RB allocation of the second repetition (e.g., indicated by SLIV in the scheduling information). The UE 904 may then decide which of the frequency segments 1104A, 1104B, and 1104C corresponds to the uplink subband. In some cases, $M = \lfloor RB_{UL}/N_{ULSB}^{Size} \rfloor$ may indicate a number of possible frequency segments (e.g., may indicate the number of frequency segments within the plurality of frequency segments) corresponding to the uplink subband, where $RB_{UL}$ is the number of RBs of a scheduled PUSCH transmission and $N_{ULSB}$ refer to the bandwidth of the UL subband in RBs. The division of these two quantities using floor operation gives the possible chunks of contiguous RBs that can be used for UL transmission within the UL subband.

The UE 904 may then select a frequency segment of the plurality of frequency segments corresponding to the uplink subband of the FD slot (e.g., frequency segment 1104B) based on at least one of a slot number associated with the first FD slot or a radio temporary network identifier (RNTI). In some cases, selecting the frequency segment may include selecting an index of a frequency segment from i=0, 1, 2, ..., M-1 based radio resource control (RRC) signaling from the network entity 902 or some other dynamic signaling, such as RNTI, slot number, and/or the like.

Accordingly, after determining the uplink subband of the FD slot, the UE 904 may then determine that the set of frequencies over which the second repetition is to be transmitted in the FD slot do not coincide with the uplink subband of the FD slot (e.g., does not coincide with frequency segment 1104B). In such cases, rather than dropping the second repetition since it does not coincide with the uplink subband of the FD slot (e.g., do not coincide with frequency segment 1104B), the UE 904 may instead select another second starting RB for the second repetition to be in the selected frequency segment (e.g. frequency segment 1104B) corresponding to the uplink subband of the FD slot.

Thereafter, taking the one or more actions in block 920 of FIG. 9 may include, as shown at 940, transmitting the first repetition in the non-FD slot based on the first starting RB and transmitting the second repetition in the FD slot based on second starting RB.

In some cases, when the set of frequencies over which the second repetition is to be transmitted in the FD slot do not coincide with the uplink subband of the FD slot, taking the one or more actions in block 920 of FIG. 9 may include dropping transmission of the second repetition in the FD slot, as shown at 930 in FIG. 9. For example, with reference to FIG. 10, when the UE 904 determines that the frequency resources for transmitting the third repetition 1016 in the first FD slot 1008 fall outside the uplink subband 1007, the UE 904 may drop the third repetition 1016 from being transmitted in the first FD slot 1008 (and any subsequent slot). While the third repetition 1016 is used as an example, it should be understood that the UE 904 may generally drop any repetition that does not coincide with an uplink subband of a slot.

In some cases, rather than dropping repetitions when inter-slot frequency hopping is used, the UE 904 may apply an available slot scheme, allowing the UE 904 to determine which slots are unavailable for transmitting repetitions and to "delay" transmission of repetitions occurring within these unavailable slots for transmission in a subsequent available slot.

For example, in some cases, the UE 904 may identify which slots are available or not based on frequency domain resource availability associated with repetitions. More specifically, for example, the UE 904 may determine whether a set of frequency resources for transmitting the second repetition scheduled by the scheduling information coincide with the uplink subband of the FD slot.

In some cases, when the set of frequency resources for transmitting the second repetition coincide with the uplink subband of the FD slot, the FD slot may be considered as available. In such cases, taking the one or more actions in block 920 of FIG. 9 may include transmitting the second repetition in the second FD slot, as shown at 940 in FIG. 9. In other cases, when the set of frequencies over which the first repetition is to be transmitted in the first FD slot do not coincide with the uplink subband of the first FD slot, the FD slot is not considered as an available slot for transmission of the second repetition by the UE 904. In such cases, based on the FD slot being considered as not available, taking the one or more actions in block 920 in FIG. 9 may include transmitting the second repetition in a subsequent available slot.

Figure 12:
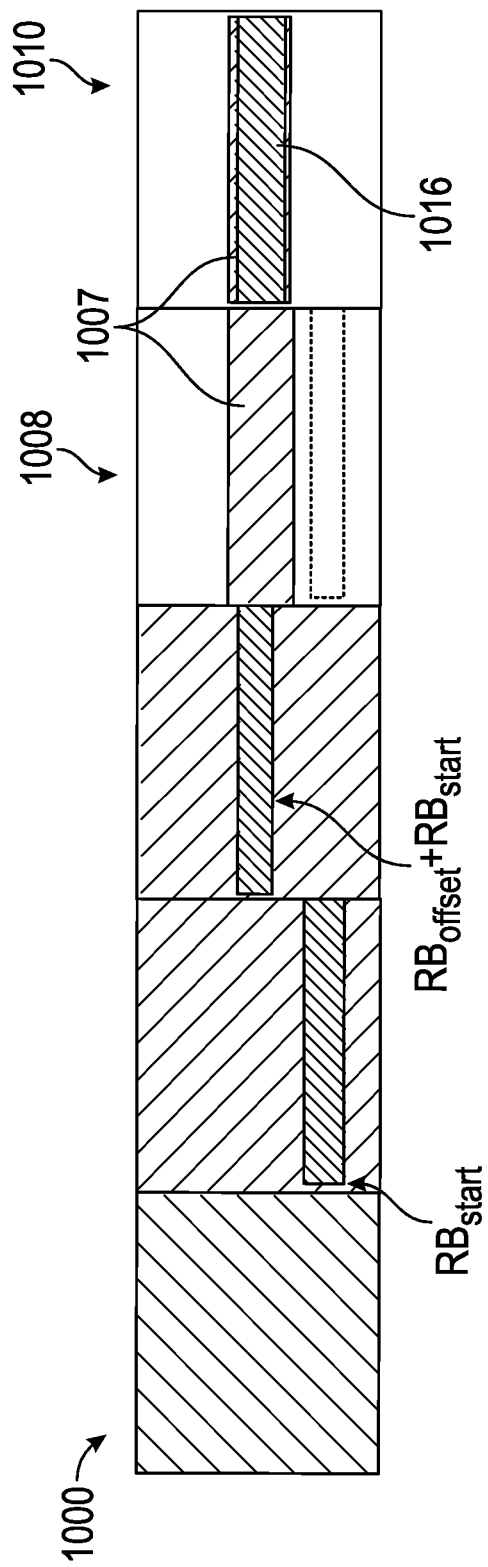
FIGS. 12, 13, and 14 illustrate slot formats including SBFD slots for transmitting PUSCH repetitions.

An example of a non-available slot and delaying transmission of a repetition is illustrated in FIG. 12. For example, FIG. 12 again illustrates the slot format 1000 including the first FD slot 1008 and third repetition 1016. In the example shown in FIG. 12, the UE 904 may determine that the first FD slot 1008 is not available for transmitting the third repetition 1016 since a set of frequency resources (e.g., determined based on the starting RB of the third repetition 1016, $RB_{start}$) for transmitting the third repetition do not coincide with the uplink subband 1007 of the first FD slot 1008. Accordingly, the UE 904 may delay transmission of the third repetition and may transmit the third repetition within the second FD slot 1010. In such cases, the fourth repetition 1018 described in relation to FIG. 10 would then be transmitted by the UE 904 in another subsequent available slot.

In some cases, a slot may include more than one repetition. In such cases, a slot may be considered available for transmitting repetitions only when frequency resources for transmitting each repetition within the slot are available. In other cases, the slot may be considered available if a set of frequency resources corresponding to a first repetition within the slot are available. In some cases, when frequency resources for a first repetition within a slot are available but frequency resources for a second repetition within the slot are not available, the slot may still be considered to be available. However, the UE 904 may need to drop the second repetition from being transmitted within the slot since the frequency resources for this second repetition are not available (e.g., they do not coincide with an uplink subband of this slot).

In some cases, to help avoid situations in which frequency resources for transmitting the second repetition (e.g., scheduled by the scheduling information received at 910 by the UE 904 in FIG. 9) do not coincide with the uplink subband of the FD slot, a starting RB for the second repetition may be determined based further on a reference RB. The reference RB may be configured so that frequency resources for transmitting the second repetition coincide with the uplink subband of the FD slot. An example of determining the starting RB based on a reference RB is illustrated in Equation 4.

$$RB_{start} = \begin{cases} RB_{start} + RB_{reference}, & i = 0 \\ (RB_{start} + RB_{offset} + RB_{reference}) \bmod N_{BWP}^{size}, & i = 1 \end{cases} \quad (4)$$

As shown in Equation 4, for non-FD slots (i=0), the starting RB for the second repetition may be determined as the combination of the starting RB ($RB_{start}$) indicated in the scheduling information and a reference RB ($RB_{reference}$). For FD slots (i=1), the starting RB for the second repetition may be determined as the combination of the starting RB ($RB_{start}$) indicated in the scheduling information, the at least one RB offset indicated in the scheduling information ($RB_{offset}$), and the reference RB ($RB_{reference}$). After determining the starting RB for the second repetition based on the reference RB, taking the one or more actions in block 920 by the UE 904 in FIG. 9 may include transmitting the second repetition in the first FD slot based on the starting RB.

In some cases, a value of the reference RB may be different between FD and non-FD slots. For example, in some cases, a value of the reference RB for non-FD slots may be zero while the value of the reference RB for FD slots may be non-zero (e.g., to help ensure the starting RB of a repetition falls within an uplink subband of these FD slots).

In some cases, the reference RB may be signaled to the UE 904 by the network entity 902 using RRC signaling or some other type of dynamic signaling. In some cases, the reference RB may be pre-configured in memory of the UE 904 and selected based on a size of an uplink subband of the FD slot in which the first repetition is to be transmitted.

Figure 13:
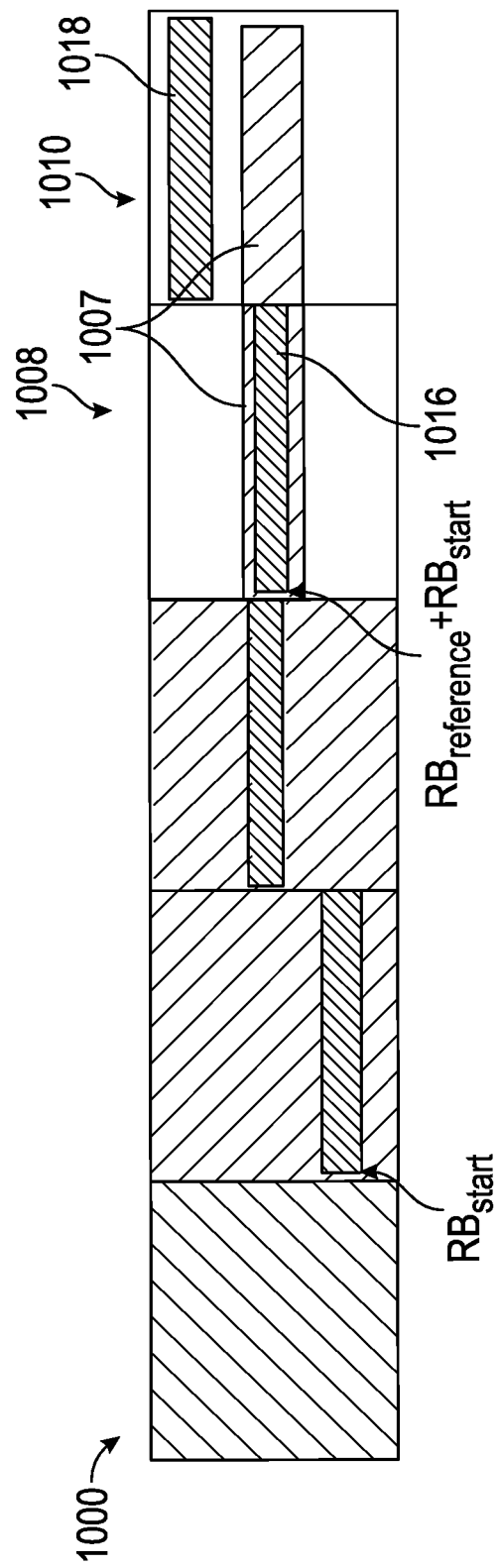

An example of using a reference RB to determine the starting RB for a repetition is illustrated in FIG. 13. For example, FIG. 13 again illustrates the slot format 1000 including the first FD slot 1008 and third repetition 1016. In some cases, the UE 904 may use a reference RB to determine the starting RB for the third repetition 1016 according to Equation 4, above. Accordingly, as shown, because the UE 904 uses a reference RB to determine the starting RB for the third repetition 1016 in the first FD slot 1008, the starting RB for the third repetition 1016 may coincide with the uplink subband 1007 of the first FD slot 1008.

In some cases, the reference RB may cause other repetitions within FD slot to fall outside an uplink subband of a slot. For example, as shown in FIG. 13, when determining a starting RB based on the reference RB, the starting RB for the fourth repetition 1018 may be pushed outside of the uplink subband 1007 of the second FD slot 1010. To help address this issue, in some cases, a size of the uplink subband of an FD slot may be taken into account when determining the starting RBs for repetitions transmitted within these slots. For example, in some cases, the UE 904 may use Equation 5, below, when determining a starting RB for the second repetition within the FD slot.

$$RB_{start} = \begin{cases} RB_{start} + RB_{reference}, & i = 0 \\ (RB_{start} + RB_{offset} + RB_{reference}) \bmod N_{ULSB}^{size}, & i = 1 \end{cases} \quad (5)$$

Figure 14:
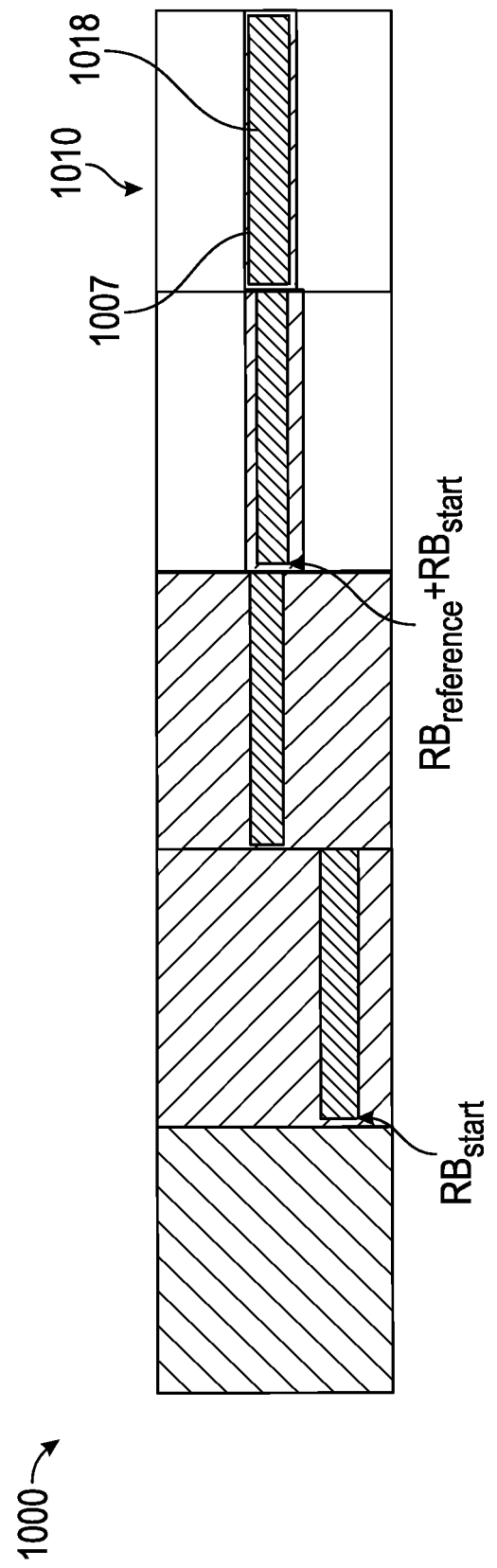

As shown, for a non-FD slot (i=0), the starting RB for the second repetition may be determined as the combination of the starting RB ($RB_{start}$) indicated in the scheduling information and a reference RB ($RB_{reference}$) (e.g., which may have a value of zero for non-FD slots). For FD slots (i=1), the starting RB for the second repetition may be determined by the UE 904 by performing a modulo operation involving the size of the uplink subband ($N_{ULSB}^{size}$) on the sum of the starting RB ($RB_{start}$) indicated in the scheduling information, the at least one RB offset indicated in the scheduling information ($RB_{offset}$), and the reference RB ($RB_{reference}$). This modulo operation may confine the starting RB of the second repetition to be within the uplink subband of the FD slot and may help to multiplex different UEs within the limited uplink resources. Accordingly, as shown in FIG. 14, by taking the size of the uplink subband 1007 of the second FD slot 1010 into account when determining the starting RB of the fourth repetition 1018, the starting RB and frequency resources for transmitting the fourth repetition 1018 may coincide with the uplink subband 1007 of the second FD slot 1010 in contrast to FIG. 13.

It should be noted that, in some cases, the reference RB may not be necessary and may be excluded from Equation 5. In other words, in some cases, the starting RB for the second repetition may be determined by the UE 904 by performing a modulo operation involving the size of the uplink subband ($N_{ULSB}^{size}$) on the sum of the starting RB ($RB_{start}$) indicated in the scheduling information and the at least one RB offset indicated in the scheduling information ($RB_{offset}$).

Example Operations of a User Equipment

Figure 15:
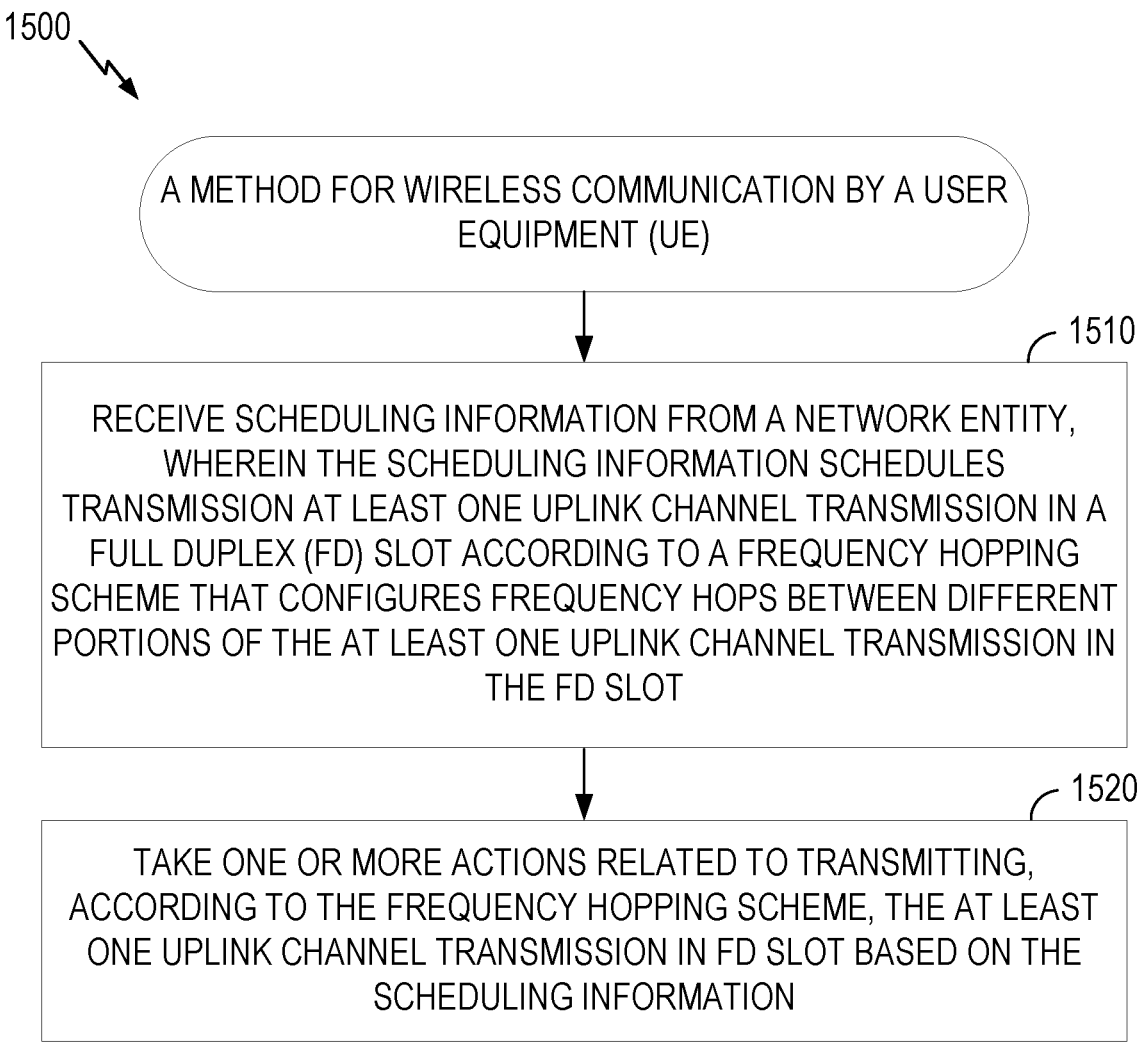
FIG. 15 depicts a method for wireless communication.

FIG. 15 shows a method 1500 for wireless communication by a UE, such as UE 104 of FIGS. 1 and 2.

Method 1500 begins at 1502 with the UE receiving scheduling information from a network entity. In some cases, the scheduling information schedules transmission at least one uplink channel transmission in a full duplex (FD) slot according to a frequency hopping scheme that configures frequency hops between different portions of the at least one uplink channel transmission in the FD slot. In some cases, the FD slot includes an uplink subband and a downlink subband of a larger bandwidth part (BWP). In some cases, the scheduling information indicates at least one starting resource block (RB) for the at least one uplink channel transmission and at least one RB offset, selected from a set of RB offsets, for at least one uplink channel transmission.

Method 1500 then proceeds to step 1520 with the UE taking one or more actions related to transmitting, according to the frequency hopping scheme, the at least one uplink channel transmission in FD slot based on the scheduling information received in step 1510.

In some cases, the scheduling information schedules a first portion of the at least one uplink channel transmission in the FD slot, a second portion of the at least one uplink channel transmission in the FD slot, and a frequency hop between the first portion of the at least one uplink channel transmission and the second portion of the uplink channel transmission. Additionally, in some cases, a first starting RB in the FD slot for the first portion comprises the starting RB indicated in the scheduling information for the FD slot and a second starting RB in the FD slot for the second portion is based on the at least one RB offset indicated in the scheduling information for the FD slot.

In some cases, when the uplink subband of the FD slot comprises a number of RBs less than a threshold, the set of RB offsets from which the at least one RB offset is selected comprises greater than two RB offsets. In some cases, when the uplink subband of the FD slot comprises a number of RBs greater than or equal to the threshold, the set of RB offsets from which the at least one RB offset is selected comprises greater than four RB offsets.

In some cases, the set of RB offsets from which the at least one RB offset is selected for the FD slot is different from another set of RB offsets for a non-FD slot.

In some cases, the second starting RB is further based on the at least one starting RB indicated in the scheduling information for the FD slot and a size of the uplink subband of the FD slot.

In some cases, method 1500 may further include determining that at least a part of the second portion of the at least one uplink channel transmission is scheduled to occur outside of the uplink subband of the FD slot.

In some cases, based on the determination that the part of the second portion of the at least one uplink channel transmission is scheduled to occur outside of the uplink subband of the FD slot, taking the one or more actions in step 1520 includes dropping the first portion and the second portion of the at least one uplink channel transmission from being transmitted in the FD slot.

In some cases, based on the determination that the part of the second portion of the at least one uplink channel transmission is scheduled to occur outside of the uplink subband of the FD slot, taking the one or more actions in step 1520 includes ignoring the frequency hop scheduled between the first portion of the at least one uplink channel transmission and the second portion of the at least one uplink channel transmission, and transmitting the first portion of the at least one uplink channel transmission and the second portion of the at least one uplink channel transmission based on the at least one starting RB within the FD slot.

In some cases, method 1500 may further include receiving, from the BS an indication of a threshold number of RBs and determining whether a number of RBs in the part of the second portion of the at least one uplink channel transmission scheduled to occur outside of the uplink subband of the FD slot is greater than the threshold number of RBs. In some cases, when, based on the determination, the number of RBs in the part of the second portion scheduled to occur outside the uplink subband of the FD slot is greater than the threshold number of RBs, taking the one or more actions in step 1520 includes dropping the first portion and the second portion from being transmitted in the FD slot.

In some cases, when, based on the determination, the number of RBs in the part of the second portion scheduled to occur outside the uplink subband of the FD slot is not greater than the threshold number of RBs, taking the one or more actions in step 1520 includes puncturing the number of RBs scheduled to occur outside the uplink subband and transmitting at least a remaining number of RBs of the second portion of the at least one uplink channel transmission within the uplink subband of the FD slot based on the second starting RB.

In some cases, method 1500 may further include applying an offset to the second starting RB for the second portion of the at least one uplink channel transmission such that the second portion of the at least one uplink channel transmission is fully contained in the uplink subband of the FD slot. In such cases, taking the one or more actions in step 1520 includes transmitting the first portion of the at least one uplink channel transmission in the FD slot based on the first starting RB, and transmitting the second portion of the at least one uplink channel transmission in the FD slot based the second starting RB and applied offset.

In some cases, method 1500 may further include determining the second starting RB based on a first RB of the uplink subband of the FD slot and the at least one RB offset indicated in the scheduling information for the FD slot. In such cases, taking the one or more actions in step 1520 includes transmitting the first portion of the at least one uplink channel transmission in the FD slot based on the first starting RB and transmitting the second portion of the at least one uplink channel transmission in the FD slot based on second starting RB.

In some cases, the at least one RB offset is indicated via a dedicated bitfield in the scheduling information. In some cases, the at least one RB offset is indicated via a dedicated bitfield in the scheduling information and additional bits determined based on a size of the uplink subband of the FD slot.

Figure 19:
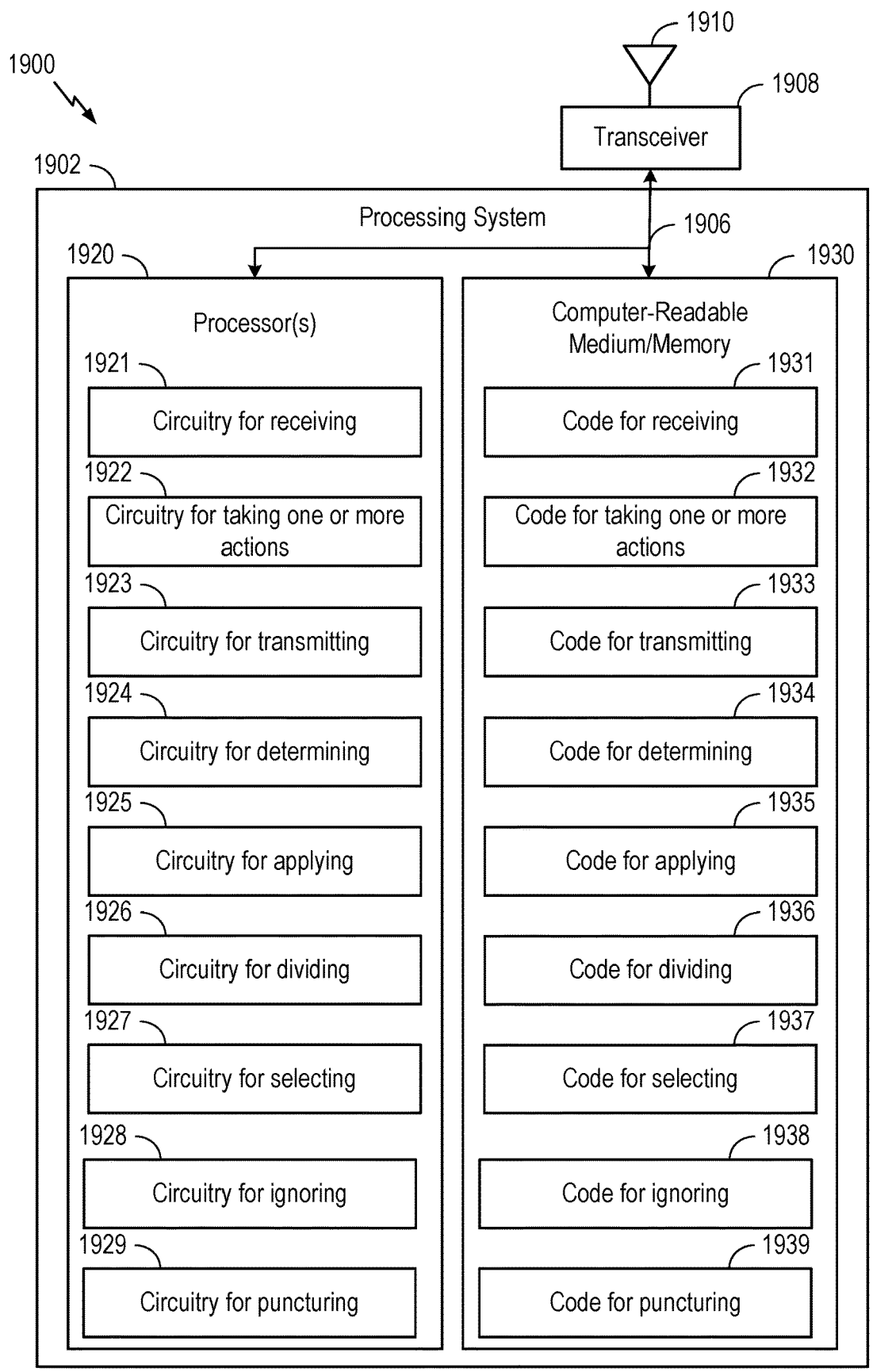
FIG. 19 depicts aspects of an example communications device.

In one aspect, method 1500, or any aspect related to it, may be performed by an apparatus, such as communication device 1900 of FIG. 19, which includes various components operable, configured, or adapted to perform the method 1500. Communication device 1900 is described below in further detail.

Note that FIG. 15 is just one example of a method, and other methods including fewer, additional, or alternative steps are possible consistent with this disclosure.

Figure 16:
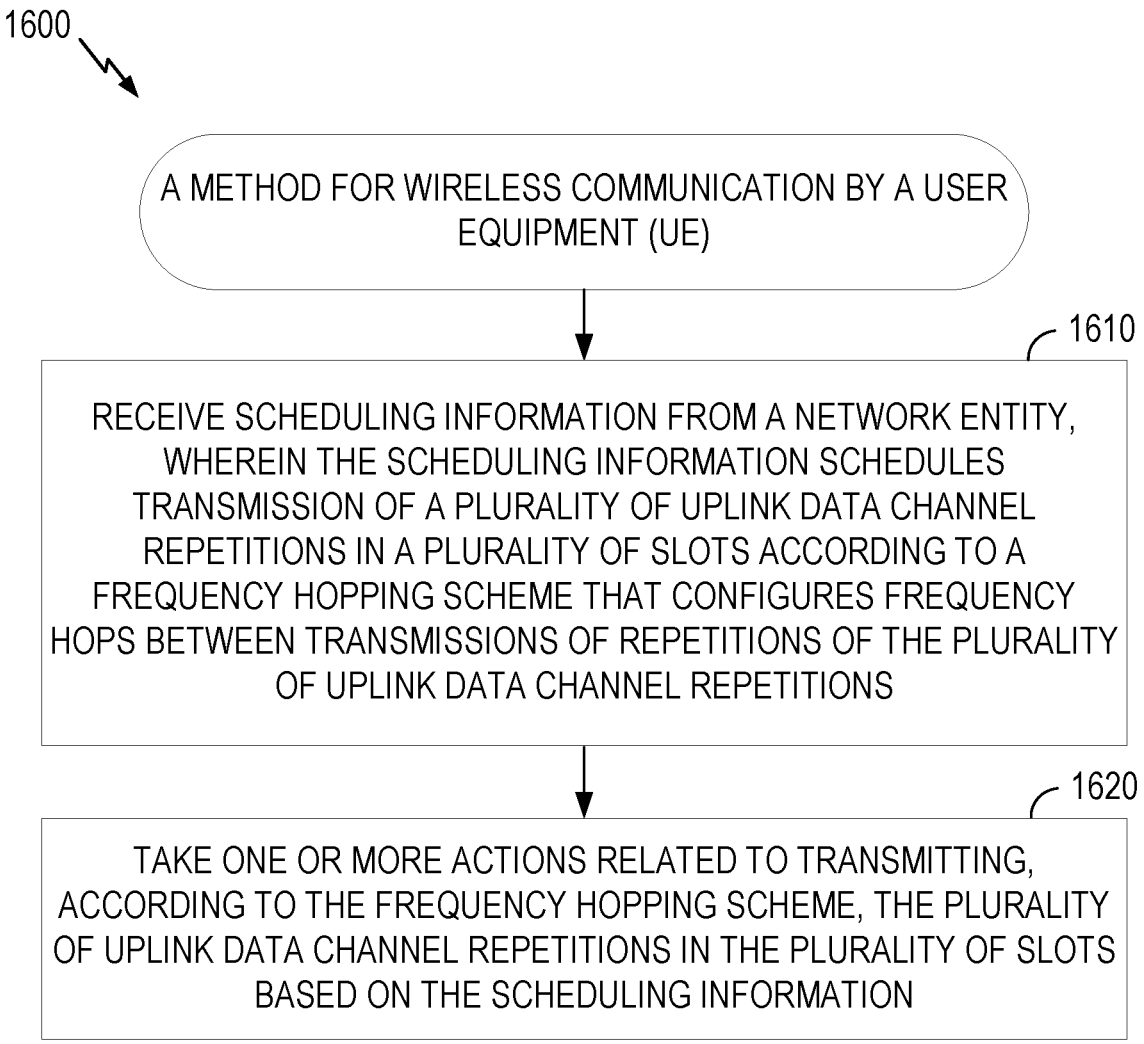
FIG. 16 depicts a method for wireless communication.

FIG. 16 shows a method 1600 for wireless communication by a UE, such as UE 104 of FIGS. 1 and 2.

Method 1600 begins at 1602 with the UE receiving scheduling information from a network entity. In some cases, the scheduling information schedules transmission of a plurality of uplink data channel repetitions in a plurality of slots according to a frequency hopping scheme that configures frequency hops between transmissions of repetitions of the plurality of uplink data channel repetitions. In some cases, the plurality of slots comprise at least a full duplex (FD) slot including an uplink subband and a downlink subband of a larger bandwidth part (BWP). In some cases, the scheduling information indicates at least one starting resource block (RB) for the plurality of uplink data channel repetitions. In some cases, the scheduling information indicates at least one RB offset, selected from a set of RB offsets, for the plurality of uplink data channel repetitions. In some cases, the scheduling information indicates a number of repetitions in the plurality of uplink data channel repetitions.

Method 1600 then proceeds to step 1620 with the UE taking one or more actions related to transmitting, according to the frequency hopping scheme, the plurality of uplink data channel repetitions in the plurality of slots based on the scheduling information received in step 1610.

In some cases, the scheduling information schedules repetitions of the plurality of uplink data channel repetitions in different slots of the plurality of slots, including a first repetition in a non-FD slot and a second repetition in the FD slot. In some cases, the first repetition in the non-FD slot is associated with the least one starting RB indicated in the scheduling information. In some cases, the second repetition in the FD slot is associated with a second starting RB.

In some cases, method 1600 further includes dividing the BWP of the FD slot into a plurality of frequency segments each frequency segment of a size equal to or approximately equal to an RB allocation of the second repetition. In some cases, method 1600 further includes selecting a frequency segment of the plurality of frequency segments corresponding to the uplink subband of the FD slot based on at least one of a slot number associated with the FD slot or a radio temporary network identifier (RNTI). In some cases, the second starting RB associated with the second repetition is selected to be in the selected frequency segment. In some cases, taking the one or more actions in step 1620 includes transmitting the first repetition in the non-FD slot based on the first starting RB and transmitting the second repetition in the FD slot based on second starting RB.

In some cases, method 1600 further includes determining the second starting RB in the FD slot for the second repetition based on the at least one starting RB indicated in the scheduling information or the at least one starting RB indicated in the scheduling information and the at least one RB offset indicated in the scheduling information.

In some cases, whether the second starting RB is determined based on the at least one starting RB or the at least one starting RB and the at least one RB offset depends on whether the FD slot is an odd slot or an even slot. In some cases, when the FD slot comprises an even slot, the second starting RB in the FD slot associated with the second repetition comprises the at least one starting RB indicated in the scheduling information. In some cases, when the FD slot comprises an odd slot, the second starting RB in the FD slot associated with the second repetition is based on the at least one starting RB indicated in the scheduling information and the at least one RB offset indicated in the scheduling information.

In some cases, method 1600 further includes determining a set of frequencies over which the second repetition is to be transmitted in the FD slot based, at least, on the second starting RB.

In some cases, taking the one or more actions in step 1620 includes dropping transmission of the second repetition in the FD slot when the set of frequencies over which the second repetition is to be transmitted in the FD slot are not contained within the uplink subband of the FD slot.

In some cases, wherein, when the set of frequencies over which the first repetition is to be transmitted in the FD slot are not contained within the uplink subband of the FD slot, the FD slot is not considered as an available slot for transmission of the second repetition by the UE. In some cases, based on the FD slot being considered as not available, taking the one or more actions in step 1620 comprises transmitting the second repetition in a subsequent available slot.

In some cases, determining the second starting RB in the FD slot associated with the second repetition is based further on a reference RB. In some cases, taking the one or more actions in step 1620 comprises transmitting the second repetition in the FD slot based on the reference RB.

In some cases, method 1600 further includes receiving an indication of the reference RB from the BS. In some cases, the reference RB is non-zero for the FD slot and zero for the non-FD slot.

In some cases, determining the second starting RB in the FD slot associated with the second repetition is based further on a size of the uplink subband of the FD slot. In some cases, taking the one or more actions in step 1620 includes transmitting the second repetition in the second FD slot based on the second starting RB.

In one aspect, method 1600, or any aspect related to it, may be performed by an apparatus, such as communication device 1900 of FIG. 19, which includes various components operable, configured, or adapted to perform the method 1600. Communication device 1900 is described below in further detail.

Note that FIG. 16 is just one example of a method, and other methods including fewer, additional, or alternative steps are possible consistent with this disclosure.

Example Operations of a Network Entity

Figure 17:
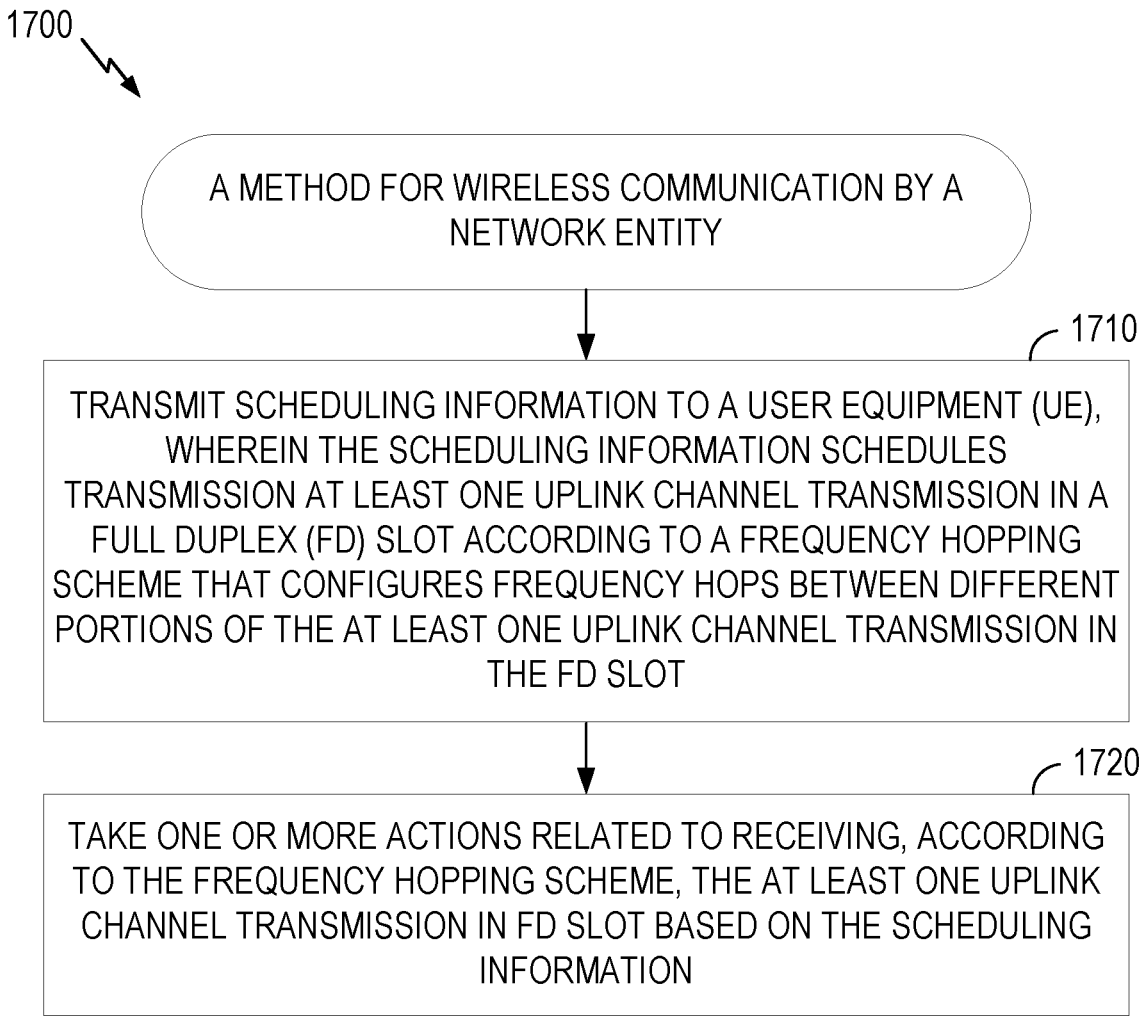
FIG. 17 depicts a method for wireless communication.
Figure 21:
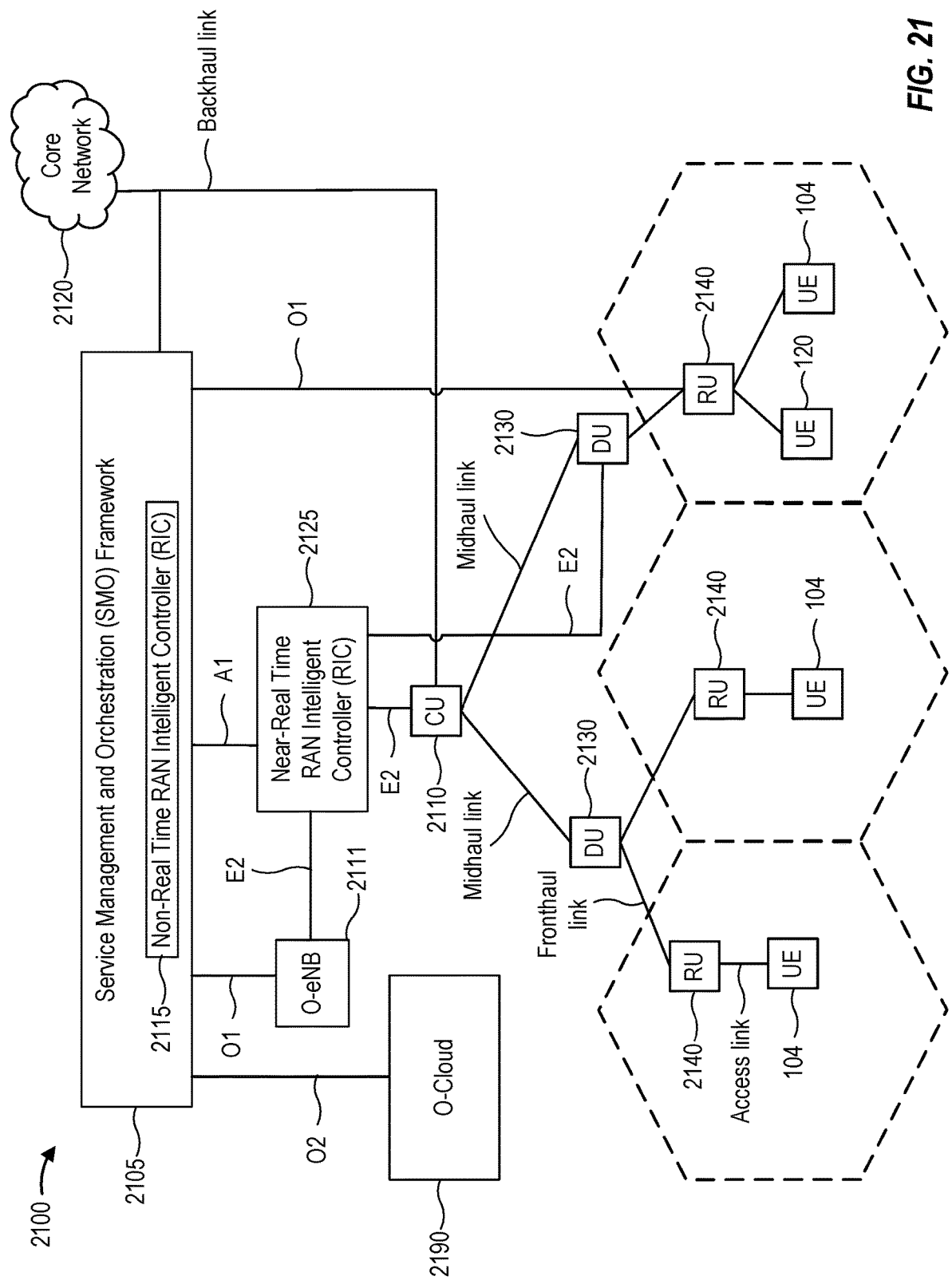
FIG. 21 depicts an example disaggregated base station architecture.

FIG. 17 shows a method 1700 for wireless communication by a network entity, such as BS 102 of FIGS. 1 and 2 or a disaggregated base station as discussed with respect to FIG. 21.

Method 1700 begins at 1710 with the BS transmitting scheduling information to a user equipment (UE). In some cases, the scheduling information schedules transmission at least one uplink channel transmission in a full duplex (FD) slot according to a frequency hopping scheme that configures frequency hops between different portions of the at least one uplink channel transmission in the FD slot. In some cases, the FD slot includes an uplink subband and a downlink subband of a larger bandwidth part (BWP). In some cases, the scheduling information indicates at least one starting resource block (RB) for the at least one uplink channel transmission and at least one RB offset, selected from a set of RB offsets, for at least one uplink channel transmission Method 1700 then proceeds to step 1720 with the BS taking one or more actions related to receiving, according to the frequency hopping scheme, the at least one uplink channel transmission in FD slot based on the scheduling information transmitted in step 1710.

In some cases, the scheduling information transmitted in step 1710 schedules a first portion of the at least one uplink channel transmission in the FD slot, a second portion of the at least one uplink channel transmission in the FD slot, and a frequency hop between the first portion of the at least one uplink channel transmission and the second portion of the uplink channel transmission. In some cases, a first starting RB in the FD slot for the first portion comprises the starting RB indicated in the scheduling information for the FD slot. In some cases, a second starting RB in the FD slot for the second portion is based on the at least one RB offset indicated in the scheduling information for the FD slot.

In some cases, when the uplink subband of the FD slot comprises a number of RBs less than a threshold, the set of RB offsets from which the at least one RB offset is selected comprises greater than two RB offsets. In some cases, when the uplink subband of the FD slot comprises a number of RBs greater than or equal to the threshold, the set of RB offsets from which the at least one RB offset is selected comprises greater than four RB offsets.

In some cases, the set of RB offsets from which the at least one RB offset is selected for the FD slot is different from another set of RB offsets for a non-FD slot.

In some cases, the second starting RB is further based on the at least one starting RB indicated in the scheduling information for the first FD slot and a size of the uplink subband of the first FD slot.

In some cases, method 1700 further includes determining that at least a part of the second portion of the at least one uplink channel transmission is scheduled to occur outside of the uplink subband of the FD slot.

In some cases, based on the determination that the part of the second portion of the at least one uplink channel transmission is scheduled to occur outside of the uplink subband of the FD slot, taking the one or more actions in step 1720 comprises dropping the first portion and the second portion of the at least one uplink channel transmission from being received in the FD slot.

In some cases, based on the determination that the part of the second portion of the at least one uplink channel transmission is scheduled to occur outside of the uplink subband of the FD slot, taking the one or more actions in step 1720 includes ignoring the frequency hop scheduled between the first portion of the at least one uplink channel transmission and the second portion of the at least one uplink channel transmission and receiving the first portion of the at least one uplink channel transmission and the second portion of the at least one uplink channel transmission based on the at least one starting RB within the FD slot.

In some cases, method 1700 further includes transmitting, to the UE, an indication of a threshold number of RBs. In some cases, when a number of RBs in the part of the second portion scheduled to occur outside the uplink subband of the first FD slot is greater than the threshold number of RBs, taking the one or more actions in step 1720 includes dropping the first repetition and the second repetition from being received in the first FD slot. In some cases, when the number of RBs in the portion of the second repetition occurring outside the uplink subband of the first FD slot is not greater than the threshold number of RBs, taking the one or more actions in step 1720 includes not receiving the number of RBs scheduled to occur outside the uplink subband and receiving at least a remaining number of RBs of the second portion of the at least one uplink channel transmission within the uplink subband of the FD slot based on the second starting RB.

In some cases, method 1700 further includes applying an offset to the second starting RB for the second portion of the at least one uplink channel transmission such that the second portion of the at least one uplink channel transmission is fully contained in the uplink subband of the FD slot. In some cases, taking the one or more actions in step 1720 includes receiving the first portion of the at least one uplink channel transmission in the FD slot based on the first starting RB and receiving the second portion of the at least one uplink channel transmission in the FD slot based the second starting RB and applied offset.

In some cases, method 1700 further includes determining the second starting RB based on a first RB of the uplink subband of the FD slot and the at least one RB offset indicated in the scheduling information for the FD slot. In some cases, taking the one or more actions in step 1720 includes receiving the first portion of the at least one uplink channel transmission in the FD slot based on the first starting RB and receiving the second portion of the at least one uplink channel transmission in the FD slot based on second starting RB.

In some cases, the at least one RB offset is indicated via a dedicated bitfield in the scheduling information. In some cases, the at least one RB offset is indicated via a dedicated bitfield in the scheduling information and additional bits determined based on a size of the uplink subband of the FD slot.

Figure 20:
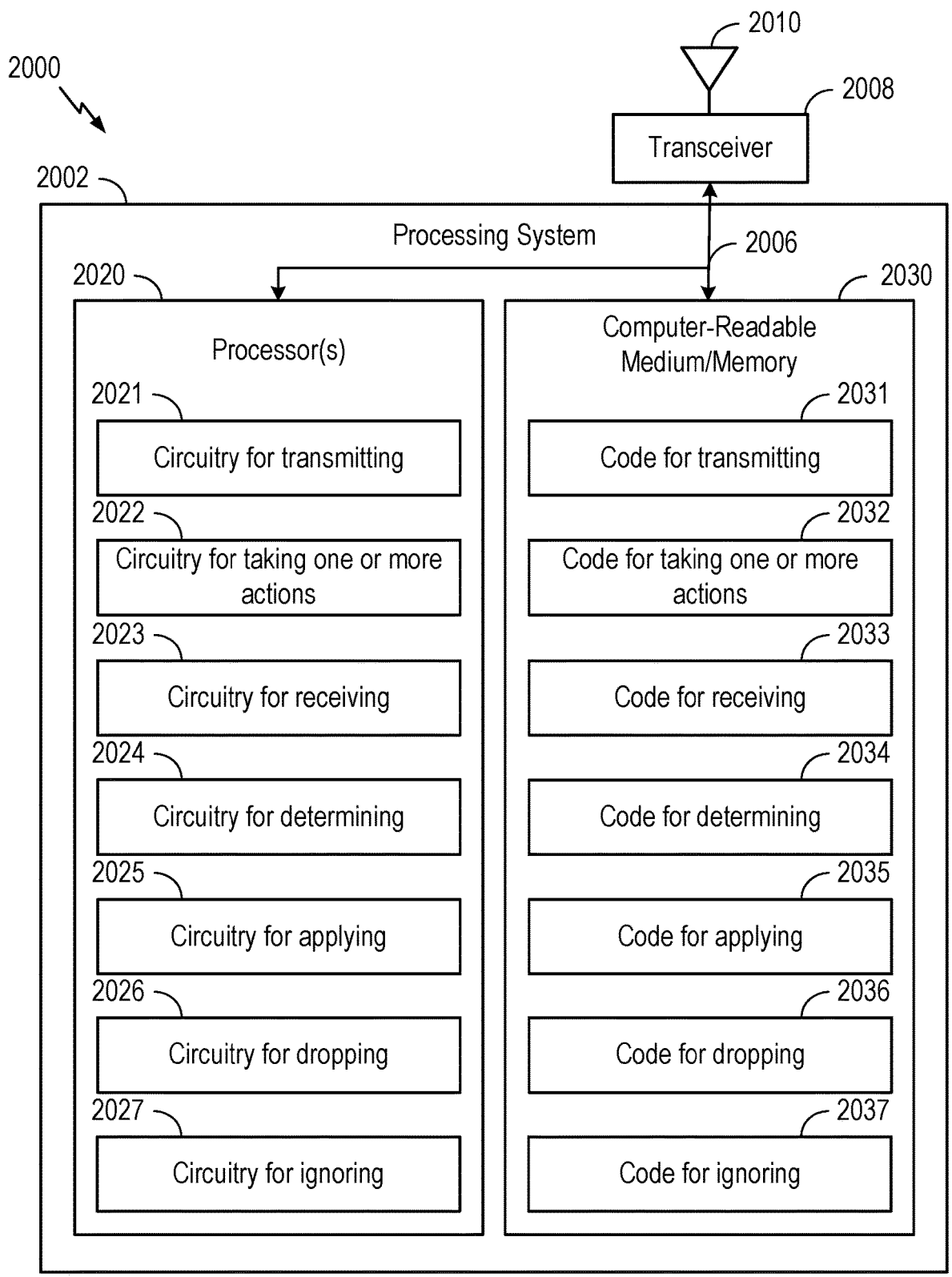
FIG. 20 depicts aspects of an example communications device.

In one aspect, method 1700, or any aspect related to it, may be performed by an apparatus, such as communication device 2000 of FIG. 20, which includes various components operable, configured, or adapted to perform the method 1700. Communication device 2000 is described below in further detail.

Note that FIG. 17 is just one example of a method, and other methods including fewer, additional, or alternative steps are possible consistent with this disclosure.

Figure 18:
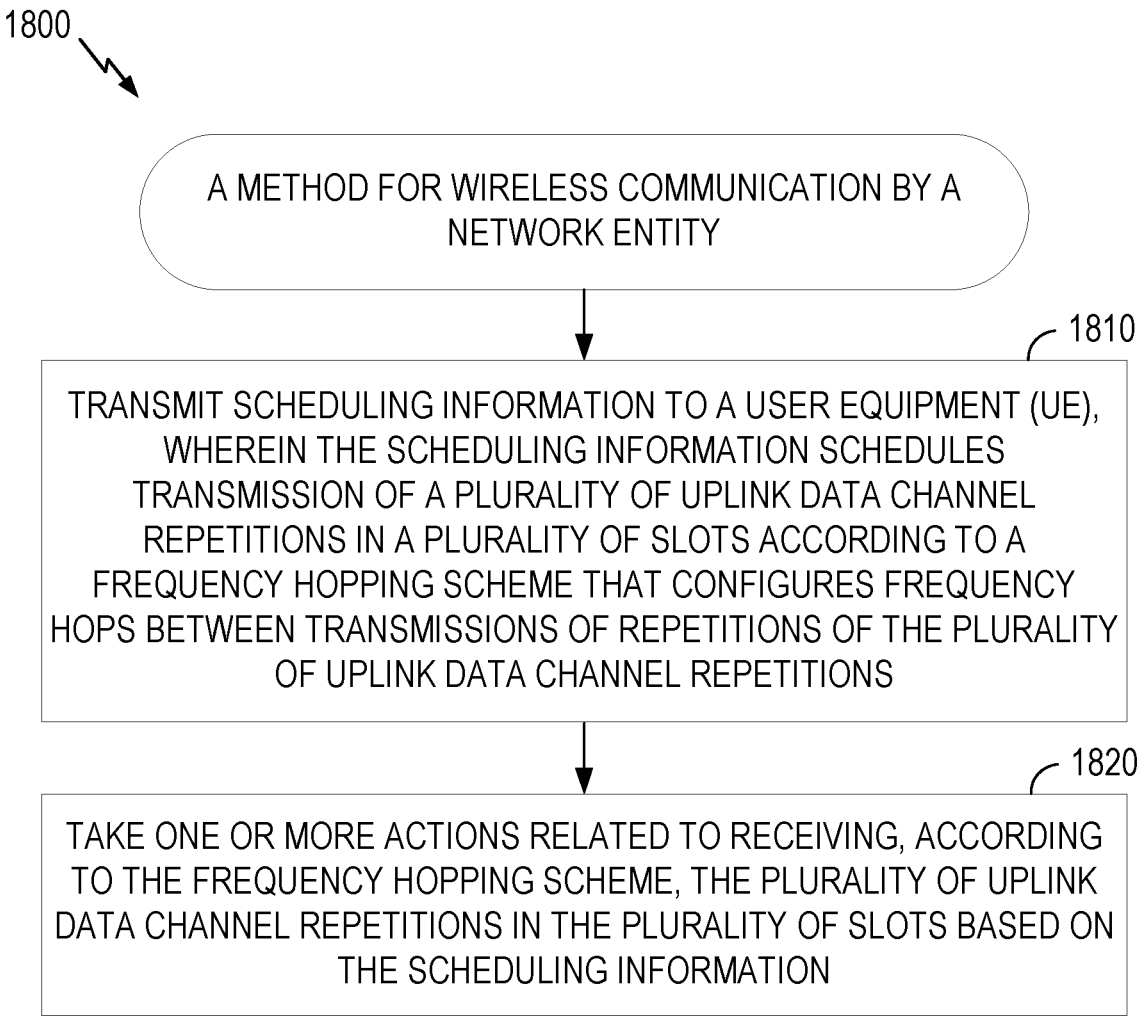
FIG. 18 depicts a method for wireless communication.

FIG. 18 shows a method 1800 for wireless communication by a network entity, such as BS 102 of FIGS. 1 and 2 or a disaggregated base station as discussed with respect to FIG. 21.

Method 1800 begins at 1810 with the BS transmitting scheduling information to a user equipment (UE). In some cases, the scheduling information schedules transmission of a plurality of uplink data channel repetitions in a plurality of slots according to a frequency hopping scheme that configures frequency hops between transmissions of repetitions of the plurality of uplink data channel repetitions. In some cases, the plurality of slots comprise at least a full duplex (FD) slot including an uplink subband and a downlink subband of a larger bandwidth part (BWP). In some cases, the scheduling information indicates at least one starting resource block (RB) for the plurality of uplink data channel repetitions. In some cases, the scheduling information indicates at least one RB offset, selected from a set of RB offsets, for the plurality of uplink data channel repetitions. In some cases, the scheduling information indicates a number of repetitions in the plurality of uplink data channel repetitions.

Method 1800 then proceeds to step 1820 with the BS taking one or more actions related to receiving, according to the frequency hopping scheme, the plurality of uplink data channel repetitions in the plurality of slots based on the scheduling information transmitted in step 1810.

In some cases, the scheduling information schedules repetitions of the plurality of uplink data channel repetitions in different slots of the plurality of slots, including a first repetition in a non-FD slot and a second repetition in the FD slot. In some cases, the first repetition in the non-FD slot is associated with the least one starting RB indicated in the scheduling information. In some cases, the second repetition in the FD slot is associated with a second starting RB.

In some cases, method 1800 further includes determining the second starting RB in the FD slot for the second repetition based on: the at least one starting RB indicated in the scheduling information, or the at least one starting RB indicated in the scheduling information and the at least one RB offset indicated in the scheduling information.

In some cases, whether the second starting RB is determined based on the at least one starting RB or the at least one starting RB and the at least one RB offset depends on whether the FD slot is an odd slot or an even slot. In some cases, when the FD slot comprises an even slot, the second starting RB in the FD slot associated with the second repetition comprises the at least one starting RB indicated in the scheduling information. In some cases, when the FD slot comprises an odd slot, the second starting RB in the FD slot associated with the second repetition is based on the at least one starting RB indicated in the scheduling information and the at least one RB offset indicated in the scheduling information.

In some cases, method 1800 further includes determining a set of frequencies over which the second repetition is to be transmitted in the FD slot based, at least, on the second starting RB.

In some cases, taking the one or more actions in step 1820 includes dropping reception of the second repetition in the FD slot when the set of frequencies over which the second repetition is to be transmitted in the FD slot are not contained within the uplink subband of the FD slot.

In some cases, when the set of frequencies over which the first repetition is to be transmitted in the FD slot are not contained within the uplink subband of the first FD slot, the FD slot is not considered as an available slot for transmission of the second repetition by the UE and, based on the FD slot being considered as not available, taking the one or more actions in step 1820 includes receiving the second repetition in a subsequent available slot.

In some cases, determining the second starting RB in the FD slot associated with the second repetition is based further on a reference RB. In some cases, taking the one or more actions in step 1820 includes receiving the second repetition in the FD slot based on the reference RB.

In some cases, method 1800 further includes transmitting an indication of the reference RB to the UE. In some cases, the reference RB is non-zero for the FD slot and zero for the non-FD slot.

In some cases, determining the second starting RB in the FD slot associated with the second repetition is based further on a size of the uplink subband of the FD slot. In some cases, taking the one or more actions in step 1820 includes receiving the second repetition in the second FD slot based on the second starting RB.

In one aspect, method 1800, or any aspect related to it, may be performed by an apparatus, such as communication device 2000 of FIG. 20, which includes various components operable, configured, or adapted to perform the method 1800. Communication device 2000 is described below in further detail.

Note that FIG. 18 is just one example of a method, and other methods including fewer, additional, or alternative steps are possible consistent with this disclosure.

Example Communication Devices

FIG. 19 depicts aspects of an example communication device 1900. In some aspects, communications device 1900 is a user equipment, such as UE 104 described above with respect to FIGS. 1 and 2.

The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes one or more processors 1920. In various aspects, the one or more processors 1920 may be representative of one or more of receive processor 258, transmit processor 264, TX MIMO processor 266, and/or controller/processor 280, as described with respect to FIG. 2. The one or more processors 1920 are coupled to a computer-readable medium/memory 1930 via a bus 1906. In certain aspects, the computer-readable medium/memory 1930 is configured to store instructions (e.g., computer-executable code) that when executed by the one or more processors 1920, cause the one or more processors 1920 to perform the method 1500 described with respect to FIG. 15 and/or the method 1600 described with respect to FIG. 16, or any aspects related to them. Note that reference to a processor performing a function of communications device 1900 may include one or more processors performing that function of communications device 1900.

In the depicted example, computer-readable medium/memory 1930 stores code (e.g., executable instructions) for receiving 1931, code for taking one or more actions 1932, code for transmitting 1933, code for determining 1934, code for applying 1935, code for dividing 1936, code for selecting 1937, code for ignoring 1938, and code for puncturing 1939. Processing of the code 1931-1939 may cause the communication device 1900 to perform the method 1500 described with respect to FIG. 15 and/or the method 1600 described with respect to FIG. 6, or any aspects related to them.

The one or more processors 1920 include circuitry configured to implement (e.g., execute) the code stored in the computer-readable medium/memory 1930, including circuitry for receiving 1921, circuitry for taking one or more actions 1922, circuitry for transmitting 1923, circuitry for determining 1924, circuitry for applying 1925, circuitry for dividing 1926, circuitry for selecting 1927, circuitry for ignoring 1928, and circuitry for puncturing 1929. Processing with circuitry 1921-1929 may cause the communication device 1900 to perform the method 1500 described with respect to FIG. 15 and/or the method 1600 described with respect to FIG. 16, or any aspects related to them.

Various components of the communications device 1900 may provide means for performing the method 1500 described with respect to FIG. 15 and/or the method 1600 described with respect to FIG. 16, or any aspects related to them. For example, means for transmitting, sending or outputting for transmission may include the transceivers 254 and/or antenna(s) 252 of the UE 104 illustrated in FIG. 2 and/or transceiver 1908 and antenna 1910 of the communication device 1900 in FIG. 19. Means for receiving or obtaining may include the transceivers 254 and/or antenna(s) 252 of the UE 104 illustrated in FIG. 2 and/or transceiver 1908 and antenna 1910 of the communication device 1900 in FIG. 19. Means for determining, means for taking one or more actions, means for applying, means for dividing, means for selecting, means for puncturing, and means for ignoring may comprise one or more processors, such as the controller/processor 280, the transmit processor 264, and/or the receive processor 258.

FIG. 20 depicts aspects of an example communications device. In some aspects, communications device 2000 is a network entity, such as BS 102 described above with respect to FIGS. 1 and 2 or a disaggregated base station as described with respect to FIG. 21.

The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes one or more processors 2020. In various aspects, one or more processors 2020 may be representative of one or more of receive processor 238, transmit processor 220, TX MIMO processor 230, and/or controller/processor 240, as described with respect to FIG. 2. The one or more processors 2020 are coupled to a computer-readable medium/memory 2030 via a bus 2006. In certain aspects, the computer-readable medium/memory 2030 is configured to store instructions (e.g., computer-executable code) that when executed by the one or more processors 2020, cause the one or more processors 2020 to perform the method 1700 described with respect to FIG. 17 and/or the method the method 1800 described with respect to FIG. 18, or any aspects related to them. Note that reference to a processor of communications device 2000 performing a function may include one or more processors of communications device 2000 performing that function.

In the depicted example, the computer-readable medium/memory 2030 stores code (e.g., executable instructions) for transmitting 2031, code for taking one or more actions 2032, code for receiving 2033, code for determining 2034, code for applying 2035, code for dropping 2036, and code for ignoring 2037. Processing of the code 2031-2037 may cause the communication device 2000 to perform the method 1700 described with respect to FIG. 17 and/or the method the method 1800 described with respect to FIG. 18, or any aspects related to them.

The one or more processors 2020 include circuitry configured to implement (e.g., execute) the code stored in the computer-readable medium/memory 2030, including circuitry for transmitting 2021, circuitry for taking one or more actions 2022, circuitry for receiving 2023, circuitry for determining 2024, circuitry for applying 2025, circuitry for dropping 2026, and circuitry for ignoring 2027. Processing with circuitry 2021-2027 may cause the communication device 2000 to perform the method 1700 described with respect to FIG. 17 and/or the method the method 1800 described with respect to FIG. 18, or any aspects related to them.

Various components of the communications device 2000 may provide means for performing the method 1700 described with respect to FIG. 17 and/or the method the method 1800 described with respect to FIG. 18, or any aspects related to them. Means for transmitting, sending or outputting for transmission may include the transceivers 232 and/or antenna(s) 234 of the BS 102 illustrated in FIG. 2 and/or transceiver 2008 and antenna 2010 of the communication device 2000 in FIG. 20. Means for receiving or obtaining may include the transceivers 232 and/or antenna(s) 234 of the BS 102 illustrated in FIG. 2 and/or transceiver 2008 and antenna 2010 of the communication device 2000 in FIG. 20. Means for determining, means for taking one or more actions, means for applying, means for dropping, and means for ignoring may comprise one or more processors, such as the controller/processor 280, the transmit processor 264, and/or the receive processor 258.

Example Clauses

Implementation examples are described in the following numbered clauses:

Clause 1: A method of wireless communication by a user equipment (UE), comprising: receiving scheduling information from network entity, wherein: the scheduling information schedules transmission at least one uplink channel transmission in a full duplex (FD) slot according to a frequency hopping scheme that configures frequency hops between different portions of the at least one uplink channel transmission in the FD slot, the FD slot includes an uplink subband and a downlink subband of a larger bandwidth part (BWP), and the scheduling information indicates at least one starting resource block (RB) for the at least one uplink channel transmission and at least one RB offset, selected from a set of RB offsets, for at least one uplink channel transmission; and taking one or more actions related to transmitting, according to the frequency hopping scheme, the at least one uplink channel transmission in FD slot based on the scheduling information.

Clause 2: The method of Clause 1, wherein: the scheduling information schedules: a first portion of the at least one uplink channel transmission in the FD slot, a second portion of the at least one uplink channel transmission in the FD slot, and a frequency hop between the first portion of the at least one uplink channel transmission and the second portion of the uplink channel transmission, a first starting RB in the FD slot for the first portion comprises the starting RB indicated in the scheduling information for the FD slot, and a second starting RB in the FD slot for the second portion is based on the at least one RB offset indicated in the scheduling information for the FD slot.

Clause 3: The method of Clause 2, wherein: when the uplink subband of the FD slot comprises a number of RBs less than a threshold, the set of RB offsets from which the at least one RB offset is selected comprises greater than two RB offsets, and when the uplink subband of the FD slot comprises a number of RBs greater than or equal to the threshold, the set of RB offsets from which the at least one RB offset is selected comprises greater than four RB offsets.

Clause 4: The method of any one of Clauses 2-3, wherein the set of RB offsets from which the at least one RB offset is selected for the FD slot is different from another set of RB offsets for a non-FD slot.

Clause 5: The method of any one of Clauses 2-4, wherein the second starting RB is further based on the at least one starting RB indicated in the scheduling information for the FD slot and a size of the uplink subband of the FD slot.

Clause 6: The method of any one of Clauses 2-5, further comprising determining that at least a part of the second portion of the at least one uplink channel transmission is scheduled to occur outside of the uplink subband of the FD slot.

Clause 7: The method of Clause 6, wherein, based on the determination that the part of the second portion of the at least one uplink channel transmission is scheduled to occur outside of the uplink subband of the FD slot, taking the one or more actions comprises dropping the first portion and the second portion of the at least one uplink channel transmission from being transmitted in the FD slot.

Clause 8: The method of Clause 6, wherein, based on the determination that the part of the second portion of the at least one uplink channel transmission is scheduled to occur outside of the uplink subband of the FD slot, taking the one or more actions compromise: ignoring the frequency hop scheduled between the first portion of the at least one uplink channel transmission and the second portion of the at least one uplink channel transmission, and transmitting the first portion of the at least one uplink channel transmission and the second portion of the at least one uplink channel transmission based on the at least one starting RB within the FD slot.

Clause 9: The method of Clause 6, further comprising: receiving, from the BS an indication of a threshold number of RBs; determining whether a number of RBs in the part of the second portion of the at least one uplink channel transmission scheduled to occur outside of the uplink subband of the FD slot is greater than the threshold number of RBs; and one of: when, based on the determination, the number of RBs in the part of the second portion scheduled to occur outside the uplink subband of the FD slot is greater than the threshold number of RBs, taking the one or more actions comprises dropping the first portion and the second portion from being transmitted in the FD slot, and when, based on the determination, the number of RBs in the part of the second portion scheduled to occur outside the uplink subband of the FD slot is not greater than the threshold number of RBs, taking the one or more actions comprises: puncturing the number of RBs scheduled to occur outside the uplink subband, and transmitting at least a remaining number of RBs of the second portion of the at least one uplink channel transmission within the uplink subband of the FD slot based on the second starting RB.

Clause 10: The method of Clause 6, further comprising applying an offset to the second starting RB for the second portion of the at least one uplink channel transmission such that the second portion of the at least one uplink channel transmission is fully contained in the uplink subband of the FD slot, wherein taking the one or more actions comprises: transmitting the first portion of the at least one uplink channel transmission in the FD slot based on the first starting RB, and transmitting the second portion of the at least one uplink channel transmission in the FD slot based the second starting RB and applied offset.

Clause 11: The method of Clause 6, further comprising determining the second starting RB based on a first RB of the uplink subband of the FD slot and the at least one RB offset indicated in the scheduling information for the FD slot, wherein taking the one or more actions comprises: transmitting the first portion of the at least one uplink channel transmission in the FD slot based on the first starting RB, and transmitting the second portion of the at least one uplink channel transmission in the FD slot based on second starting RB.

Clause 12: The method of any one of Clauses 1-11, wherein: the at least one RB offset is indicated via a dedicated bitfield in the scheduling information, or the at least one RB offset is indicated via a dedicated bitfield in the scheduling information and additional bits determined based on a size of the uplink subband of the FD slot.

Clause 13: A method of wireless communication by a user equipment (UE), comprising: receiving scheduling information from a network entity, wherein: the scheduling information schedules transmission of a plurality of uplink data channel repetitions in a plurality of slots according to a frequency hopping scheme that configures frequency hops between transmissions of repetitions of the plurality of uplink data channel repetitions, the plurality of slots comprise at least a full duplex (FD) slot including an uplink subband and a downlink subband of a larger bandwidth part (BWP), and the scheduling information indicates: at least one starting resource block (RB) for the plurality of uplink data channel repetitions, at least one RB offset, selected from a set of RB offsets, for the plurality of uplink data channel repetitions, and a number of repetitions in the plurality of uplink data channel repetitions; and taking one or more actions related to transmitting, according to the frequency hopping scheme, the plurality of uplink data channel repetitions in the plurality of slots based on the scheduling information.

Clause 14: The method of Clause 13, wherein: the scheduling information schedules repetitions of the plurality of uplink data channel repetitions in different slots of the plurality of slots, including a first repetition in a non-FD slot and a second repetition in the FD slot, the first repetition in the non-FD slot is associated with the least one starting RB indicated in the scheduling information, and the second repetition in the FD slot is associated with a second starting RB.

Clause 15: The method of Clause 14, further comprising: dividing the BWP of the FD slot into a plurality of frequency segments each frequency segment of a size equal to or approximately equal to an RB allocation of the second repetition; and selecting a frequency segment of the plurality of frequency segments corresponding to the uplink subband of the FD slot based on at least one of a slot number associated with the FD slot or a radio temporary network identifier (RNTI), wherein: the second starting RB associated with the second repetition is selected to be in the selected frequency segment, and taking the one or more actions comprises: transmitting the first repetition in the non-FD slot based on the first starting RB, and transmitting the second repetition in the FD slot based on second starting RB.

Clause 16: The method of Clause 14, further comprising determining the second starting RB in the FD slot for the second repetition based on: the at least one starting RB indicated in the scheduling information, or the at least one starting RB indicated in the scheduling information and the at least one RB offset indicated in the scheduling information.

Clause 17: The method of Clause 16, wherein: whether the second starting RB is determined based on the at least one starting RB or the at least one starting RB and the at least one RB offset depends on whether the FD slot is an odd slot or an even slot, when the FD slot comprises an even slot, the second starting RB in the FD slot associated with the second repetition comprises the at least one starting RB indicated in the scheduling information, and when the FD slot comprises an odd slot, the second starting RB in the FD slot associated with the second repetition is based on the at least one starting RB indicated in the scheduling information and the at least one RB offset indicated in the scheduling information.

Clause 18: The method of Clause 17, further comprising determining a set of frequencies over which the second repetition is to be transmitted in the FD slot based, at least, on the second starting RB.

Clause 19: The method of Clause 18, wherein taking the one or more actions comprises dropping transmission of the second repetition in the FD slot when the set of frequencies over which the second repetition is to be transmitted in the FD slot are not contained within the uplink subband of the FD slot.

Clause 20: The method of Clause 18, wherein, when the set of frequencies over which the first repetition is to be transmitted in the FD slot are not contained within the uplink subband of the FD slot: the FD slot is not considered as an available slot for transmission of the second repetition by the UE, and based on the FD slot being considered as not available, taking the one or more actions comprises transmitting the second repetition in a subsequent available slot.

Clause 21: The method of Clause 16, wherein: determining the second starting RB in the FD slot associated with the second repetition is based further on a reference RB, and taking the one or more actions comprises transmitting the second repetition in the FD slot based on the reference RB.

Clause 22: The method of Clause 21, further comprising receiving an indication of the reference RB from the BS.

Clause 23: The method of any one of Clauses 21-22, wherein the reference RB is non-zero for the FD slot and zero for the non-FD slot.

Clause 24: The method of Clause 16, wherein: determining the second starting RB in the FD slot associated with second repetition is based further on a size of the uplink subband of the FD slot, and taking the one or more actions comprises transmitting the second repetition in the second FD slot based on the second starting RB.

Clause 25: A method of wireless communication by a base station (BS), comprising: transmitting scheduling information to a user equipment (UE), wherein: the scheduling information schedules transmission at least one uplink channel transmission in a full duplex (FD) slot according to a frequency hopping scheme that configures frequency hops between different portions of the at least one uplink channel transmission in the FD slot, the FD slot includes an uplink subband and a downlink subband of a larger bandwidth part (BWP), and the scheduling information indicates at least one starting resource block (RB) for the at least one uplink channel transmission and at least one RB offset, selected from a set of RB offsets, for at least one uplink channel transmission; and taking one or more actions related to receiving, according to the frequency hopping scheme, the at least one uplink channel transmission in FD slot based on the scheduling information.

Clause 26: The method of Clause 25, wherein: the scheduling information schedules: a first portion of the at least one uplink channel transmission in the FD slot, a second portion of the at least one uplink channel transmission in the FD slot, and a frequency hop between the first portion of the at least one uplink channel transmission and the second portion of the uplink channel transmission, a first starting RB in the FD slot for the first portion comprises the starting RB indicated in the scheduling information for the FD slot, and a second starting RB in the FD slot for the second portion is based on the at least one RB offset indicated in the scheduling information for the FD slot.

Clause 27: The method of Clause 26, wherein: when the uplink subband of the FD slot comprises a number of RBs less than a threshold, the set of RB offsets from which the at least one RB offset is selected comprises greater than two RB offsets, and when the uplink subband of the FD slot comprises a number of RBs greater than or equal to the threshold, the set of RB offsets from which the at least one RB offset is selected comprises greater than four RB offsets.

Clause 28: The method of any one of Clauses 26-27, wherein the set of RB offsets from which the at least one RB offset is selected for the FD slot is different from another set of RB offsets for a non-FD slot.

Clause 29: The method of any one of Clauses 26-28, wherein the second starting RB is further based on the at least one starting RB indicated in the scheduling information for the first FD slot and a size of the uplink subband of the first FD slot.

Clause 30: The method of any one of Clauses 26-29, further comprising determining that at least a part of the second portion of the at least one uplink channel transmission is scheduled to occur outside of the uplink subband of the FD slot.

Clause 31: The method of Clause 30, wherein, based on the determination that the part of the second portion of the at least one uplink channel transmission is scheduled to occur outside of the uplink subband of the FD slot, taking the one or more actions comprises dropping the first portion and the second portion of the at least one uplink channel transmission from being received in the FD slot.

Clause 32: The method of Clause 30, wherein, based on the determination that the part of the second portion of the at least one uplink channel transmission is scheduled to occur outside of the uplink subband of the FD slot, taking the one or more actions compromise: ignoring the frequency hop scheduled between the first portion of the at least one uplink channel transmission and the second portion of the at least one uplink channel transmission, and receiving the first portion of the at least one uplink channel transmission and the second portion of the at least one uplink channel transmission based on the at least one starting RB within the FD slot.

Clause 33: The method of Clause 30, further comprising: transmitting, to the UE, an indication of a threshold number of RBs, wherein: when a number of RBs in the part of the second portion scheduled to occur outside the uplink subband of the first FD slot is greater than the threshold number of RBs, taking the one or more actions comprises dropping the first repetition and the second repetition from being received in the first FD slot, and when the number of RBs in the portion of the second repetition occurring outside the uplink subband of the first FD slot is not greater than the threshold number of RBs, taking the one or more actions comprises: not receiving the number of RBs scheduled to occur outside the uplink subband, and receiving at least a remaining number of RBs of the second portion of the at least one uplink channel transmission within the uplink subband of the FD slot based on the second starting RB.

Clause 34: The method of Clause 30, further comprising applying an offset to the second starting RB for the second portion of the at least one uplink channel transmission such that the second portion of the at least one uplink channel transmission is fully contained in the uplink subband of the FD slot, wherein taking the one or more actions comprises: receiving the first portion of the at least one uplink channel transmission in the FD slot based on the first starting RB, and receiving the second portion of the at least one uplink channel transmission in the FD slot based the second starting RB and applied offset.

Clause 35: The method of Clause 30, further comprising determining the second starting RB based on a first RB of the uplink subband of the FD slot and the at least one RB offset indicated in the scheduling information for the FD slot, wherein taking the one or more actions comprises: receiving the first portion of the at least one uplink channel transmission in the FD slot based on the first starting RB, and receiving the second portion of the at least one uplink channel transmission in the FD slot based on second starting RB.

Clause 36: The method of any one of Clauses 25-25, wherein: the at least one RB offset is indicated via a dedicated bitfield in the scheduling information, or the at least one RB offset is indicated via a dedicated bitfield in the scheduling information and additional bits determined based on a size of the uplink subband of the FD slot.

Clause 37: A method of wireless communication by a base station (BS), comprising: transmitting scheduling information to a user equipment (UE), wherein: the scheduling information schedules transmission of a plurality of uplink data channel repetitions in a plurality of slots according to a frequency hopping scheme that configures frequency hops between transmissions of repetitions of the plurality of uplink data channel repetitions, the plurality of slots comprise at least a full duplex (FD) slot including an uplink subband and a downlink subband of a larger bandwidth part (BWP), and the scheduling information indicates: at least one starting resource block (RB) for the plurality of uplink data channel repetitions, at least one RB offset, selected from a set of RB offsets, for the plurality of uplink data channel repetitions, and a number of repetitions in the plurality of uplink data channel repetitions; and taking one or more actions related to receiving, according to the frequency hopping scheme, the plurality of uplink data channel repetitions in the plurality of slots based on the scheduling information.

Clause 38: The method of Clause 37, wherein: the scheduling information schedules repetitions of the plurality of uplink data channel repetitions in different slots of the plurality of slots, including a first repetition in a non-FD slot and a second repetition in the FD slot, the first repetition in the non-FD slot is associated with the least one starting RB indicated in the scheduling information, and the second repetition in the FD slot is associated with a second starting RB.

Clause 39: The method of Clause 38, further comprising determining the second starting RB in the FD slot for the second repetition based on: the at least one starting RB indicated in the scheduling information, or the at least one starting RB indicated in the scheduling information and the at least one RB offset indicated in the scheduling information.

Clause 40: The method of Clause 39, wherein: whether the second starting RB is determined based on the at least one starting RB or the at least one starting RB and the at least one RB offset depends on whether the FD slot is an odd slot or an even slot, when the FD slot comprises an even slot, the second starting RB in the FD slot associated with the second repetition comprises the at least one starting RB indicated in the scheduling information, and when the FD slot comprises an odd slot, the second starting RB in the FD slot associated with the second repetition is based on the at least one starting RB indicated in the scheduling information and the at least one RB offset indicated in the scheduling information.

Clause 41: The method of Clause 40, further comprising determining a set of frequencies over which the second repetition is to be transmitted in the FD slot based, at least, on the second starting RB.

Clause 42: The method of Clause 41, wherein taking the one or more actions comprises dropping reception of the second repetition in the FD slot when the set of frequencies over which the second repetition is to be transmitted in the FD slot are not contained within the uplink subband of the FD slot.

Clause 43: The method of Clause 41, wherein, when the set of frequencies over which the first repetition is to be transmitted in the FD slot are not contained within the uplink subband of the first FD slot: the FD slot is not considered as an available slot for transmission of the second repetition by the UE, and based on the FD slot being considered as not available, taking the one or more actions comprises receiving the second repetition in a subsequent available slot.

Clause 44: The method of Clause 39, wherein: determining the second starting RB in the FD slot associated with the second repetition is based further on a reference RB, and taking the one or more actions comprises receiving the second repetition in the FD slot based on the reference RB.

Clause 45: The method of Clause 44, further comprising transmitting an indication of the reference RB to the UE.

Clause 46: The method of any one of Clauses 44-45, wherein the reference RB is non-zero for the FD slot and zero for the non-FD slot.

Clause 47: The method of claim 39, wherein: determining the second starting RB in the FD slot associated with the second repetition is based further on a size of the uplink subband of the FD slot, and taking the one or more actions comprises receiving the second repetition in the second FD slot based on the second starting RB.

Clause 48: An apparatus, comprising: a memory comprising executable instructions; and a processor configured to execute the executable instructions and cause the apparatus to perform a method in accordance with any one of Clauses 1-47.

Clause 49: An apparatus, comprising means for performing a method in accordance with any one of Clauses 1-47.

Clause 50: A non-transitory computer-readable medium comprising executable instructions that, when executed by a processor of an apparatus, cause the apparatus to perform a method in accordance with any one of Clauses 1-47.

Clause 51: A computer program product embodied on a computer-readable storage medium comprising code for performing a method in accordance with any one of Clauses 1-47.

Additional Wireless Communication Network Considerations

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

Returning to FIG. 1, various aspects of the present disclosure may be performed within the example wireless communication network 100.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

While BSs 102 are depicted in various aspects as unitary communication devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 21 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mm Wave radio frequency bands (e.g., an mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

As noted above, FIG. 21 depicts an example disaggregated base station 2100 architecture. The disaggregated base station 2100 architecture may include one or more central units (CUs) 2110 that can communicate directly with a core network 2120 via a backhaul link, or indirectly with the core network 2120 through one or more disaggregated base station units (such as a Near-Real Time (Near-RT) RAN Intelligent Controller (RIC) 2125 via an E2 link, or a Non-Real Time (Non-RT) RIC 2115 associated with a Service Management and Orchestration (SMO) Framework 2105, or both). A CU 2110 may communicate with one or more distributed units (DUs) 2130 via respective midhaul links, such as an F1 interface. The DUs 2130 may communicate with one or more radio units (RUS) 2140 via respective fronthaul links. The RUs 2140 may communicate with respective UEs 104 via one or more radio frequency (RF) access links. In some implementations, the UE 104 may be simultaneously served by multiple RUs 2140.

Each of the units, i.e., the CUS 2110, the DUs 2130, the RUs 2140, as well as the Near-RT RICs 2125, the Non-RT RICs 2115 and the SMO Framework 2105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2110. The CU 2110 may be configured to handle user plane functionality (i.e., Central Unit-User Plane (CU-UP)), control plane functionality (i.e., Central Unit-Control Plane (CU-CP)), or a combination thereof. In some implementations, the CU 2110 can be logically split into one or more CU-UP units and one or more CU-CP units. The CU-UP unit can communicate bidirectionally with the CU-CP unit via an interface, such as the E1 interface when implemented in an O-RAN configuration. The CU 2110 can be implemented to communicate with the DU 2130, as necessary, for network control and signaling.

The DU 2130 may correspond to a logical unit that includes one or more base station functions to control the operation of one or more RUs 2140. In some aspects, the DU 2130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 2130 may further host one or more low PHY layers. Each layer (or module) can be implemented with an interface configured to communicate signals with other layers (and modules) hosted by the DU 2130, or with the control functions hosted by the CU 2110.

Lower-layer functionality can be implemented by one or more RUs 2140. In some deployments, an RU 2140, controlled by a DU 2130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2140 can be implemented to handle over the air (OTA) communication with one or more UEs 104. In some implementations, real-time and non-real-time aspects of control and user plane communication with the RU(s) 2140 can be controlled by the corresponding DU 2130. In some scenarios, this configuration can enable the DU(s) 2130 and the CU 2110 to be implemented in a cloud-based RAN architecture, such as a vRAN architecture.

The SMO Framework 2105 may be configured to support RAN deployment and provisioning of non-virtualized and virtualized network elements. For non-virtualized network elements, the SMO Framework 2105 may be configured to support the deployment of dedicated physical resources for RAN coverage requirements which may be managed via an operations and maintenance interface (such as an O1 interface). For virtualized network elements, the SMO Framework 2105 may be configured to interact with a cloud computing platform (such as an open cloud (O-Cloud) 2190) to perform network element life cycle management (such as to instantiate virtualized network elements) via a cloud computing platform interface (such as an O2 interface). Such virtualized network elements can include, but are not limited to, CUs 2110, DUs 2130, RUs 2140 and Near-RT RICs 2125. In some implementations, the SMO Framework 2105 can communicate with a hardware aspect of a 4G RAN, such as an open eNB (O-cNB) 2111, via an O1 interface. Additionally, in some implementations, the SMO Framework 2105 can communicate directly with one or more RUs 2140 via an O1 interface. The SMO Framework 2105 also may include a Non-RT RIC 2115 configured to support functionality of the SMO Framework 2105.

The Non-RT RIC 2115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2125. The Non-RT RIC 2115 may be coupled to or communicate with (such as via an A1 interface) the Near-RT RIC 2125. The Near-RT RIC 2125 may be configured to include a logical function that enables near-real-time control and optimization of RAN elements and resources via data collection and actions over an interface (such as via an E2 interface) connecting one or more CUs 2110, one or more DUs 2130, or both, as well as an O-CNB, with the Near-RT RIC 2125.

In some implementations, to generate AI/ML models to be deployed in the Near-RT RIC 2125, the Non-RT RIC 2115 may receive parameters or external enrichment information from external servers. Such information may be utilized by the Near-RT RIC 2125 and may be received at the SMO Framework 2105 or the Non-RT RIC 2115 from non-network data sources or from network functions. In some examples, the Non-RT RIC 2115 or the Near-RT RIC 2125 may be configured to tune RAN behavior or performance. For example, the Non-RT RIC 2115 may monitor long-term trends and patterns for performance and employ AI/ML models to perform corrective actions through the SMO Framework 2105 (such as reconfiguration via 01) or via creation of RAN management policies (such as A1 policies).

Returning to FIG. 2, various example components of a BS 102 and a UE 104 are depicted, which may be used to implement aspects of the present disclosure.

In regards to an example downlink transmission, BS 102 includes a transmit processor 220 that may receive data from a data source 212 and control information from a controller/processor 240. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

In order to receive the downlink transmission, UE 104 includes antennas 252a-252r that may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

In regards to an example uplink transmission, UE 104 further includes a transmit processor 264 that may receive and process data (e.g., for the PUSCH) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, and other aspects described herein.

In various aspects, UE 104 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and other aspects described herein.

In some aspects, a processor may be configured to perform various operations, such as those associated with the methods described herein, and transmit (output) to or receive (obtain) data from another interface that is configured to transmit or receive, respectively, the data.

As above, FIGS. 3A, 3B, 3C, and 3D depict various example aspects of data structures that may be used in wireless communication network 100 of FIG. 1.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 3B and 3D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 3A and 3C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include minislots, which generally have fewer symbols than an entire slot. Other wireless communication technologies may have a different frame structure and/or different channels.

Generally, the number of slots within a subframe is based on a slot configuration and a numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^u \times 15$ kHz, where u is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

As depicted in FIGS. 3A, 3B, 3C, and 3D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a user equipment (UE), comprising:
   receiving scheduling information from a network entity, wherein:
      the scheduling information schedules transmission of at least one uplink channel transmission in a full duplex (FD) slot according to a frequency hopping scheme that configures frequency hops between different portions of the at least one uplink channel transmission in the FD slot,
      the FD slot includes an uplink subband and a downlink subband of a larger bandwidth part (BWP), and
      the scheduling information indicates at least one starting resource block (RB) for the at least one uplink channel transmission and at least one RB offset, selected from a set of RB offsets, for the at least one uplink channel transmission, wherein the set of RB offsets from which the at least one RB offset is selected for the FD slot is different from another set of RB offsets for a non-FD slot; and
   taking one or more actions related to transmitting, according to the frequency hopping scheme, the at least one uplink channel transmission in the FD slot based on the scheduling information.

2. The method of claim 1, wherein:
   the scheduling information schedules:
      a first portion of the at least one uplink channel transmission in the FD slot,
      a second portion of the at least one uplink channel transmission in the FD slot, and
      a frequency hop between the first portion of the at least one uplink channel transmission and the second portion of the uplink channel transmission,
      a first starting RB in the FD slot for the first portion comprises the starting RB indicated in the scheduling information for the FD slot, and
      a second starting RB in the FD slot for the second portion is based on the at least one RB offset indicated in the scheduling information for the FD slot.

3. The method of claim 2, wherein:
   when the uplink subband of the FD slot comprises a number of RBs less than a threshold, the set of RB offsets from which the at least one RB offset is selected comprises greater than two RB offsets, and
   when the uplink subband of the FD slot comprises a number of RBs greater than or equal to the threshold, the set of RB offsets from which the at least one RB offset is selected comprises greater than four RB offsets.

4. The method of claim 2, wherein the second starting RB is further based on the at least one starting RB indicated in the scheduling information for the FD slot and a size of the uplink subband of the FD slot.

5. The method of claim 2, further comprising determining that at least a part of the second portion of the at least one uplink channel transmission is scheduled to occur outside of the uplink subband of the FD slot.

6. The method of claim 5, wherein, based on the determination that the part of the second portion of the at least one uplink channel transmission is scheduled to occur outside of the uplink subband of the FD slot, taking the one or more actions comprises dropping the first portion and the second portion of the at least one uplink channel transmission from being transmitted in the FD slot.

7. The method of claim 5, wherein, based on the determination that the part of the second portion of the at least one uplink channel transmission is scheduled to occur outside of the uplink subband of the FD slot, taking the one or more actions compromise:
   ignoring the frequency hop scheduled between the first portion of the at least one uplink channel transmission and the second portion of the at least one uplink channel transmission, and
   transmitting the first portion of the at least one uplink channel transmission and the second portion of the at least one uplink channel transmission based on the at least one starting RB within the FD slot.

8. The method of claim 5, further comprising:
   receiving, from the network entity, an indication of a threshold number of RBs;
   determining whether a number of RBs in the part of the second portion of the at least one uplink channel transmission scheduled to occur outside of the uplink subband of the FD slot is greater than the threshold number of RBs; and
   one of:
      when, based on the determination, the number of RBs in the part of the second portion scheduled to occur outside the uplink subband of the FD slot is greater than the threshold number of RBs, taking the one or more actions comprises dropping the first portion and the second portion from being transmitted in the FD slot, and
      when, based on the determination, the number of RBs in the part of the second portion scheduled to occur outside the uplink subband of the FD slot is not greater than the threshold number of RBs, taking the one or more actions comprises:
         puncturing the number of RBs scheduled to occur outside the uplink subband, and
         transmitting at least a remaining number of RBs of the second portion of the at least one uplink channel transmission within the uplink subband of the FD slot based on the second starting RB.

9. The method of claim 5, further comprising applying an offset to the second starting RB for the second portion of the at least one uplink channel transmission such that the second portion of the at least one uplink channel transmission is fully contained in the uplink subband of the FD slot, wherein taking the one or more actions comprises:
  transmitting the first portion of the at least one uplink channel transmission in the FD slot based on the first starting RB, and
  transmitting the second portion of the at least one uplink channel transmission in the FD slot based the second starting RB and the applied offset.

10. The method of claim 5, further comprising determining the second starting RB based on a first RB of the uplink subband of the FD slot and the at least one RB offset indicated in the scheduling information for the FD slot, wherein taking the one or more actions comprises:
  transmitting the first portion of the at least one uplink channel transmission in the FD slot based on the first starting RB, and
  transmitting the second portion of the at least one uplink channel transmission in the FD slot based on the second starting RB.

11. The method of claim 1, wherein:
  the at least one RB offset is indicated via a dedicated bitfield in the scheduling information, or
  the at least one RB offset is indicated via a dedicated bitfield in the scheduling information and additional bits determined based on a size of the uplink subband of the FD slot.

12. A method of wireless communication by a user equipment (UE), comprising:
  receiving scheduling information from a network entity, wherein:
    the scheduling information schedules transmission of a plurality of uplink data channel repetitions in a plurality of slots according to a frequency hopping scheme that configures frequency hops between transmissions of repetitions of the plurality of uplink data channel repetitions,
    the plurality of slots comprise at least a full duplex (FD) slot including an uplink subband and a downlink subband of a larger bandwidth part (BWP), and
    the scheduling information indicates:
      at least one starting resource block (RB) for the plurality of uplink data channel repetitions,
      at least one RB offset, selected from a set of RB offsets, for the plurality of uplink data channel repetitions, wherein the set of RB offsets from which the at least one RB offset is selected for the FD slot is different from another set of RB offsets for a non-FD slot, and
      a number of repetitions in the plurality of uplink data channel repetitions; and
  taking one or more actions related to transmitting, according to the frequency hopping scheme, the plurality of uplink data channel repetitions in the plurality of slots based on the scheduling information.

13. The method of claim 12, wherein:
  the scheduling information schedules repetitions of the plurality of uplink data channel repetitions in different slots of the plurality of slots, including a first repetition in a non-FD slot and a second repetition in the FD slot,
  the first repetition in the non-FD slot is associated with the least one starting RB indicated in the scheduling information, and
  the second repetition in the FD slot is associated with a second starting RB.

14. The method of claim 13, further comprising:
  dividing the BWP of the FD slot into a plurality of frequency segments, each frequency segment of a size equal to or approximately equal to an RB allocation of the second repetition; and
  selecting a frequency segment of the plurality of frequency segments corresponding to the uplink subband of the FD slot based on at least one of a slot number associated with the FD slot or a radio temporary network identifier (RNTI), wherein:
    the second starting RB associated with the second repetition is selected to be in the selected frequency segment, and
    taking the one or more actions comprises:
      transmitting the first repetition in the non-FD slot based on the first starting RB, and
      transmitting the second repetition in the FD slot based on the second starting RB.

15. The method of claim 13, further comprising determining the second starting RB in the FD slot for the second repetition based on:
  the at least one starting RB indicated in the scheduling information, or
  the at least one starting RB indicated in the scheduling information and the at least one RB offset indicated in the scheduling information.

16. The method of claim 15, wherein:
  whether the second starting RB is determined based on the at least one starting RB or the at least one starting RB and the at least one RB offset depends on whether the FD slot is an odd slot or an even slot,
  when the FD slot comprises an even slot, the second starting RB in the FD slot associated with the second repetition comprises the at least one starting RB indicated in the scheduling information, and
  when the FD slot comprises an odd slot, the second starting RB in the FD slot associated with the second repetition is based on the at least one starting RB indicated in the scheduling information and the at least one RB offset indicated in the scheduling information.

17. The method of claim 16, further comprising determining a set of frequencies over which the second repetition is to be transmitted in the FD slot based, at least, on the second starting RB.

18. The method of claim 17, wherein taking the one or more actions comprises dropping transmission of the second repetition in the FD slot when the set of frequencies over which the second repetition is to be transmitted in the FD slot are not contained within the uplink subband of the FD slot.

19. The method of claim 17, wherein, when the set of frequencies over which the first repetition is to be transmitted in the FD slot are not contained within the uplink subband of the FD slot:
  the FD slot is not considered as an available slot for transmission of the second repetition by the UE, and
  based on the FD slot being considered as not available, taking the one or more actions comprises transmitting the second repetition in a subsequent available slot.

20. The method of claim 15, wherein:
  determining the second starting RB in the FD slot associated with the second repetition is based further on a reference RB, and
  taking the one or more actions comprises transmitting the second repetition in the FD slot based on the reference RB.

21. The method of claim 20, further comprising receiving an indication of the reference RB from the network entity.

22. The method of claim 20, wherein the reference RB is non-zero for the FD slot and zero for the non-FD slot.

23. The method of claim 15, wherein:
determining the second starting RB in the FD slot associated with the second repetition is based further on a size of the uplink subband of the FD slot, and
taking the one or more actions comprises transmitting the second repetition in the second FD slot based on the second starting RB.

24. An apparatus, comprising:
a memory comprising executable instructions; and
a processor configured to execute the executable instructions and cause the apparatus to:
receive scheduling information from a network entity, wherein:
the scheduling information schedules transmission of at least one uplink channel transmission in a full duplex (FD) slot according to a frequency hopping scheme that configures frequency hops between different portions of the at least one uplink channel transmission in the FD slot,
the FD slot includes an uplink subband and a downlink subband of a larger bandwidth part (BWP), and
the scheduling information indicates at least one starting resource block (RB) for the at least one uplink channel transmission and at least one RB offset, selected from a set of RB offsets, for the at least one uplink channel transmission, wherein the set of RB offsets from which the at least one RB offset is selected for the FD slot is different from another set of RB offsets for a non-FD slot; and
take one or more actions related to transmitting, according to the frequency hopping scheme, the at least one uplink channel transmission in the FD slot based on the scheduling information.

25. The apparatus of claim 24, wherein:
the scheduling information schedules:
a first portion of the at least one uplink channel transmission in the FD slot,
a second portion of the at least one uplink channel transmission in the FD slot, and
a frequency hop between the first portion of the at least one uplink channel transmission and the second portion of the uplink channel transmission,
a first starting RB in the FD slot for the first portion comprises the starting RB indicated in the scheduling information for the FD slot, and
a second starting RB in the FD slot for the second portion is based on the at least one RB offset indicated in the scheduling information for the FD slot.

26. The apparatus of claim 25, wherein:
when the uplink subband of the FD slot comprises a number of RBs less than a threshold, the set of RB offsets from which the at least one RB offset is selected comprises greater than two RB offsets, and
when the uplink subband of the FD slot comprises a number of RBs greater than or equal to the threshold, the set of RB offsets from which the at least one RB offset is selected comprises greater than four RB offsets.

27. An apparatus, comprising:
a memory comprising executable instructions; and
a processor configured to execute the executable instructions and cause the apparatus to:
receive scheduling information from a network entity, wherein:
the scheduling information schedules transmission of a plurality of uplink data channel repetitions in a plurality of slots according to a frequency hopping scheme that configures frequency hops between transmissions of repetitions of the plurality of uplink data channel repetitions,
the plurality of slots comprise at least a full duplex (FD) slot including an uplink subband and a downlink subband of a larger bandwidth part (BWP), and
the scheduling information indicates:
at least one starting resource block (RB) for the plurality of uplink data channel repetitions,
at least one RB offset, selected from a set of RB offsets, for the plurality of uplink data channel repetitions, wherein the set of RB offsets from which the at least one RB offset is selected for the FD slot is different from another set of RB offsets for a non-FD slot, and
a number of repetitions in the plurality of uplink data channel repetitions; and
take one or more actions related to transmitting, according to the frequency hopping scheme, the plurality of uplink data channel repetitions in the plurality of slots based on the scheduling information.

28. The apparatus of claim 27, wherein:
the scheduling information schedules repetitions of the plurality of uplink data channel repetitions in different slots of the plurality of slots, including a first repetition in a non-FD slot and a second repetition in the FD slot,
the first repetition in the non-FD slot is associated with the least one starting RB indicated in the scheduling information, and
the second repetition in the FD slot is associated with a second starting RB.

29. The apparatus of claim 28, wherein the processor is further configured to cause the apparatus to determine the second starting RB in the FD slot for the second repetition based on:
the at least one starting RB indicated in the scheduling information, or
the at least one starting RB indicated in the scheduling information and the at least one RB offset indicated in the scheduling information.

* * * * *